Aug. 28, 1945.  W. E. MATHI  2,383,731
CALCULATING MACHINE
Filed Sept. 30, 1940    10 Sheets-Sheet 1

INVENTOR.
WALTER E. MATHI
BY Lyon & Lyon
ATTORNEYS

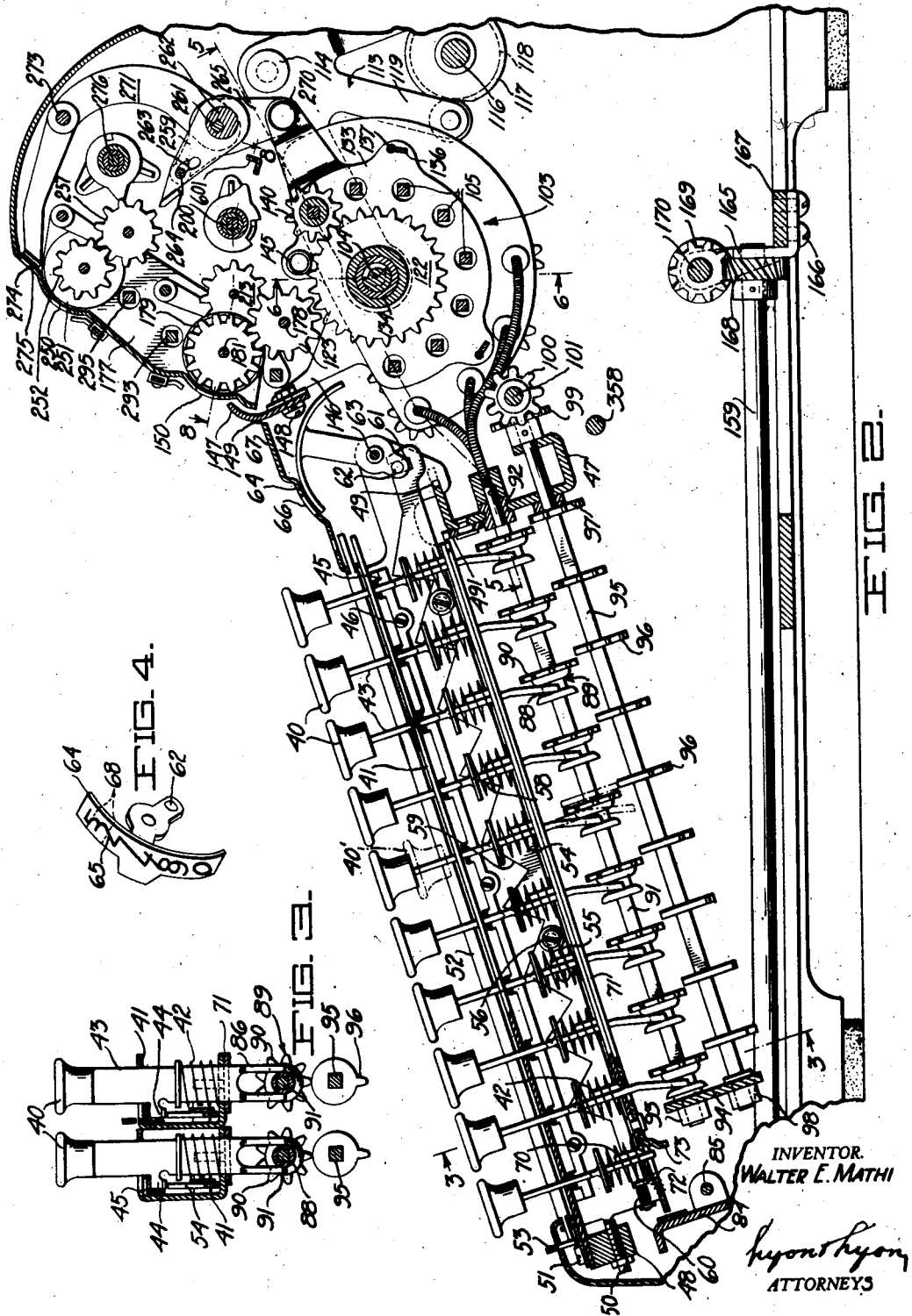

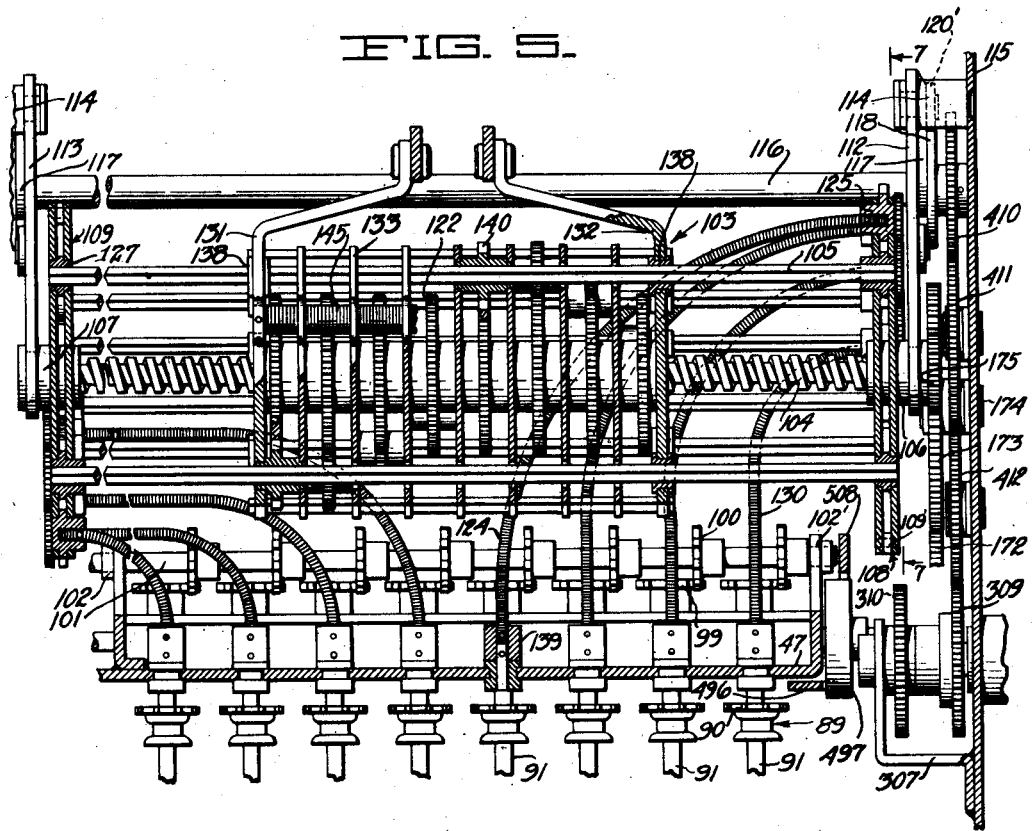
FIG. 5.
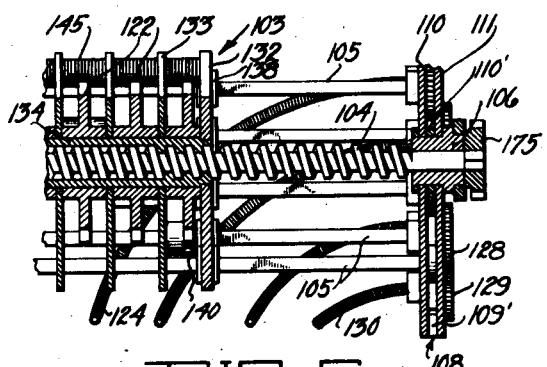
FIG. 6.
FIG. 7.
INVENTOR.
WALTER E. MATHI
BY Lyon & Lyon
ATTORNEYS.

Aug. 28, 1945.   W. E. MATHI   2,383,731
CALCULATING MACHINE
Filed Sept. 30, 1940   10 Sheets-Sheet 4
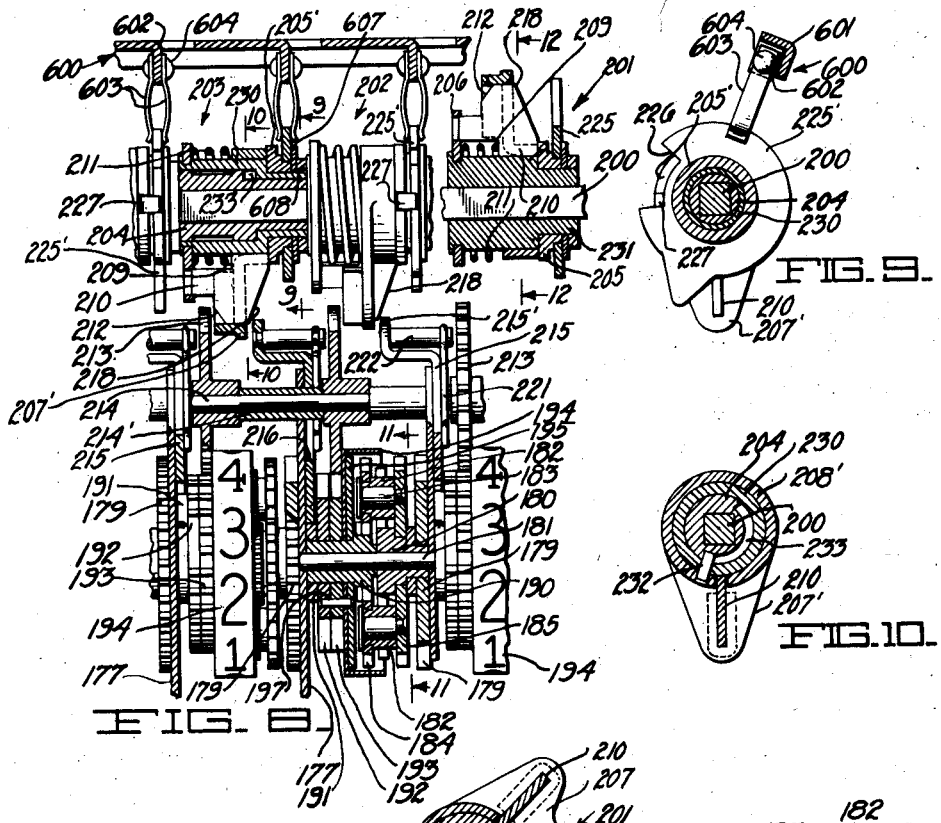
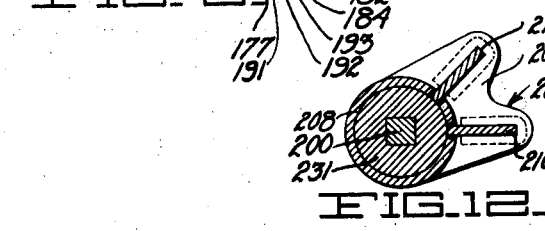
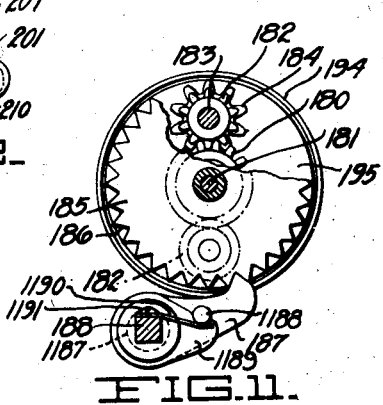
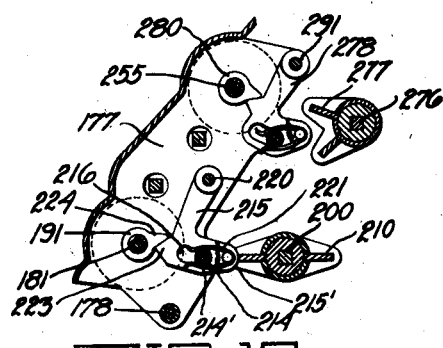
INVENTOR.
WALTER E. MATHI
BY
ATTORNEYS

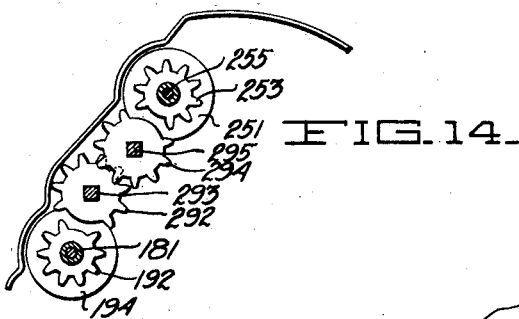
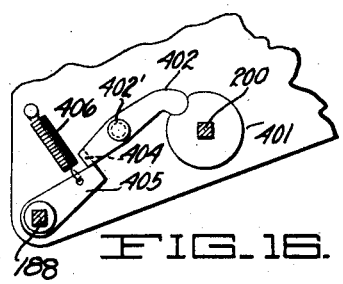
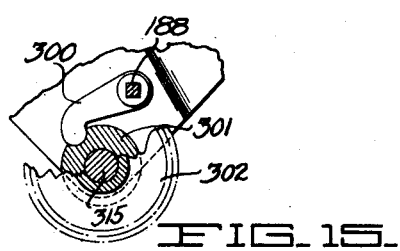
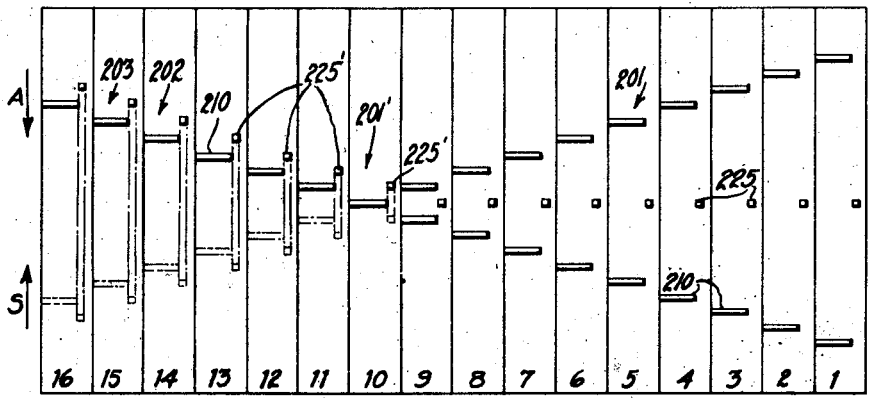

Aug. 28, 1945.　　　W. E. MATHI　　　2,383,731
CALCULATING MACHINE
Filed Sept. 30, 1940　　　10 Sheets-Sheet 6

INVENTOR.
VALTER E. MATHI
ATTORNEYS

Aug. 28, 1945.    W. E. MATHI    2,383,731
CALCULATING MACHINE
Filed Sept. 30, 1940    10 Sheets-Sheet 7
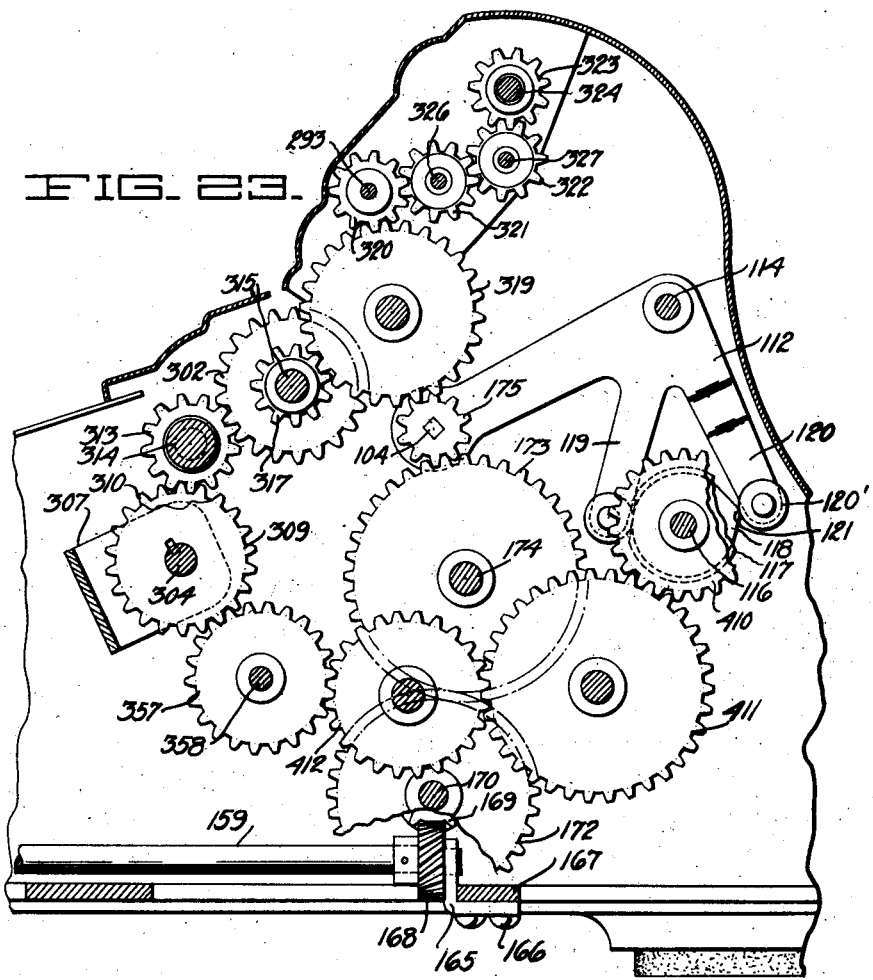
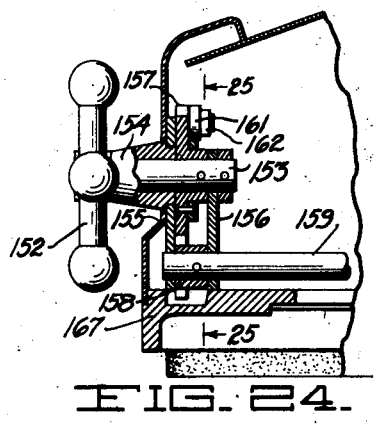
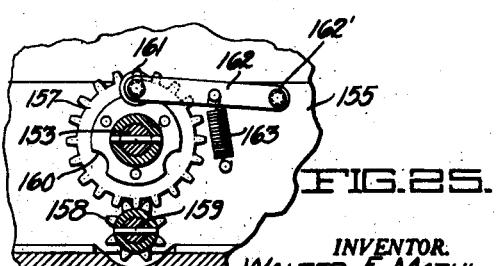
INVENTOR.
WALTER E. MATHI
BY
ATTORNEYS.

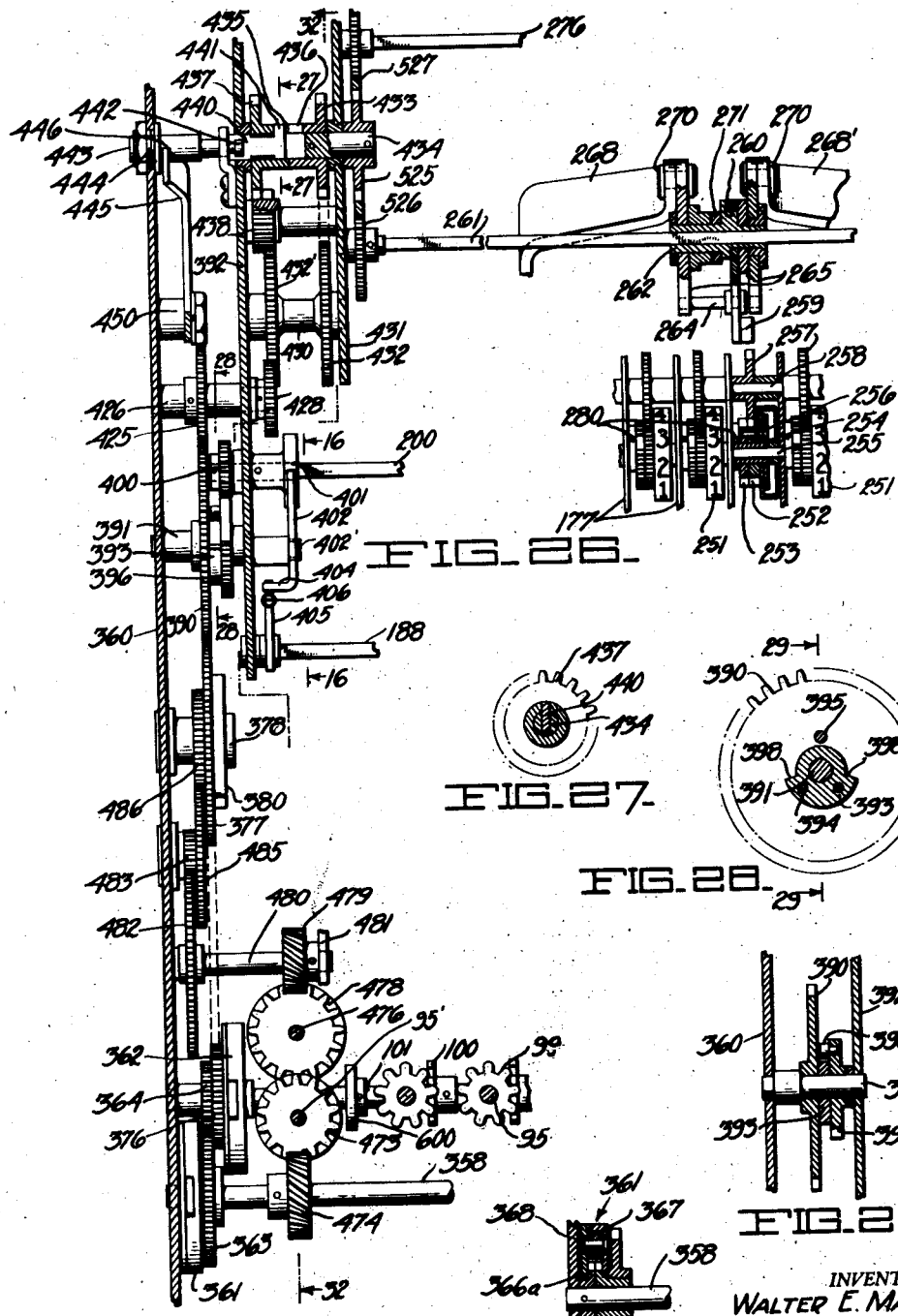

Aug. 28, 1945.   W. E. MATHI   2,383,731
CALCULATING MACHINE
Filed Sept. 30, 1940   10 Sheets-Sheet 9
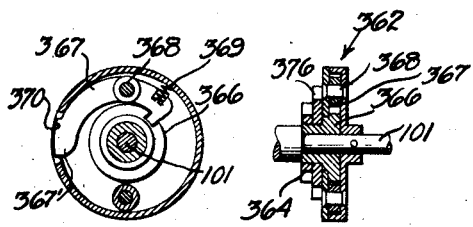
FIG. 30.   FIG. 31.
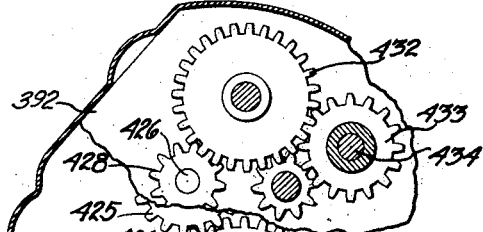
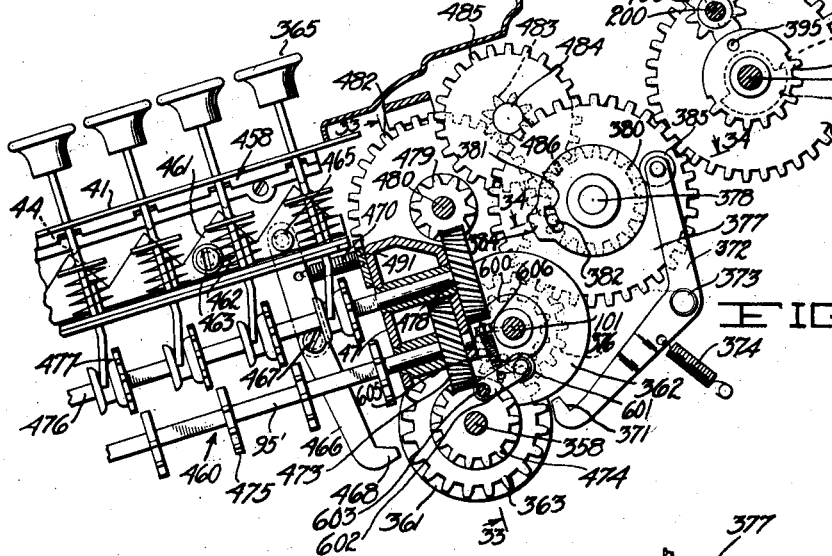
FIG. 32.
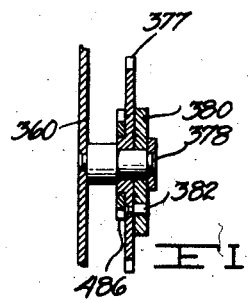
FIG. 34.
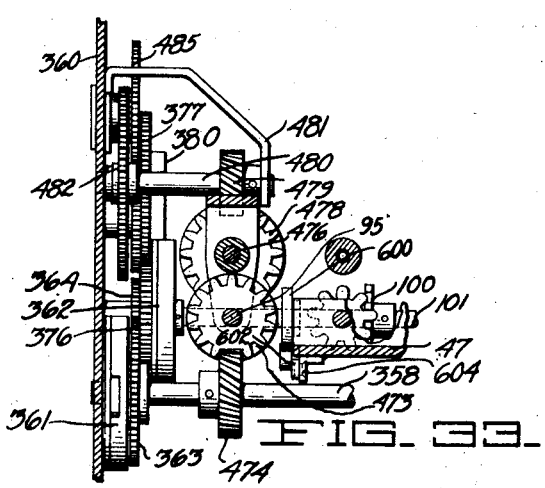
FIG. 33.
INVENTOR.
WALTER E. MATHI
BY Lyon & Lyon
ATTORNEYS Aug. 28, 1945. W. E. MATHI 2,383,731
CALCULATING MACHINE
Filed Sept. 30, 1940 10 Sheets-Sheet 10
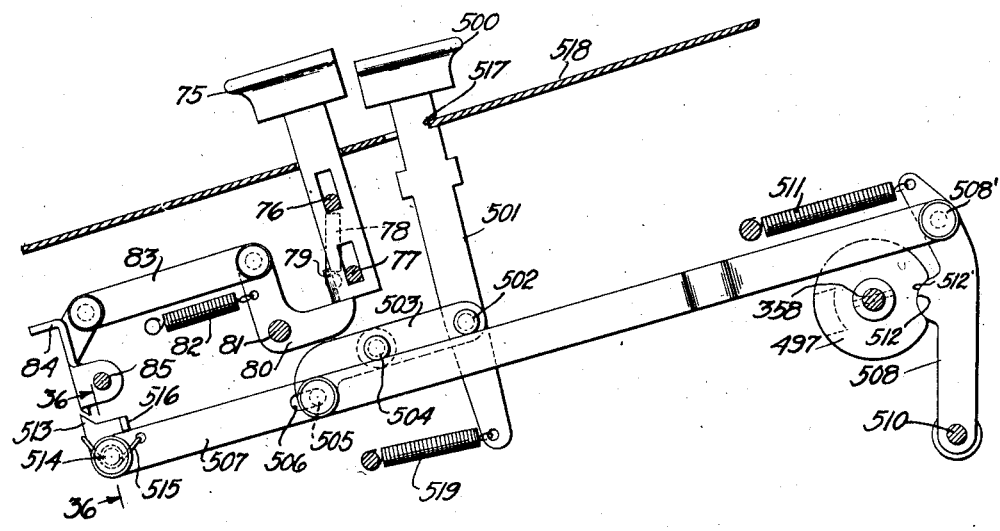
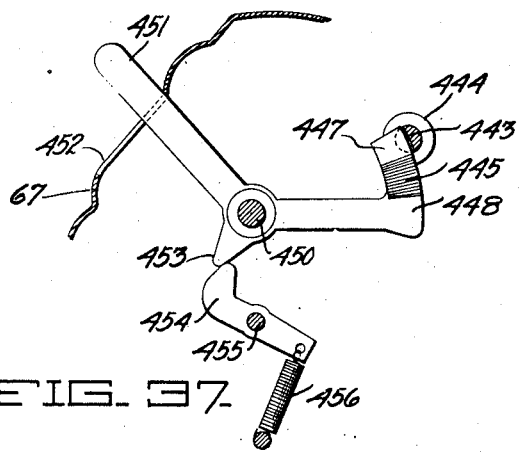
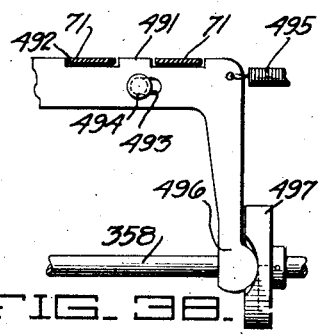
INVENTOR.
WALTER E. MATHI
BY
ATTORNEYS Patented Aug. 28, 1945

2,383,731

UNITED STATES PATENT OFFICE 2,383,731

CALCULATING MACHINE

Walter E. Mathi, Oakland, Calif., assignor to Marchant Calculating Machine Company, a corporation of California Application September 30, 1940, Serial No. 359,054

3 Claims. (Cl. 235—79)

This invention relates to calculating machines, and particularly to calculating machines capable of performing the operations of addition, subtraction, multiplication and division.

In calculating machines of this type it is necessary to provide for relative transverse movement between the accumulator register into which selected values may be entered and the selection and actuating mechanisms respectively by means of which desired values are set up, in order that the selected values may be introduced into different denominational orders of the accumulator register as may be necessary in operations of division or multiple-factor multiplication.

It has therefore been customary either to arrange the selection and actuating mechanism to be movable while keeping the accumulator register stationary or, as was more frequently the case, to provide for transverse movement of the accumulator register relative to a stationary selection and actuating mechanism.

Due to the relative movability of two such large units of a calculating machine, however, such machines occupied excessively wide desk space. Also, the shifting operation of the accumulator register relative to the selection mechanism disturbed the symmetrical appearance of the machine, and was usually accompanied by undesirable noise.

It is an object of the present invention to provide a calculating machine of great compactness and well-balanced symmetrical appearance which undergoes no changes in its external shape during operation, and which has yet all the advantages of denominational displacement between the selection mechanism and the accumulator register.

It is another object of the present invention to furnish a calculating machine in which the ordinal position of the values set up in the factor-selecting mechanism may be varied relative to the accumulator register into which they are entered, while both the selection mechanism and the accumulator register of the machine are kept stationary relative to one another.

More specifically it is an object of the present invention to provide in calculating machines of the type referred to, a transversely movable transmission mechanism between the selection and actuating mechanism and the accumulator register, such that the values set in the selection mechanism may be transmitted to different denominational orders of the accumulator register without moving either the selection and actuating mechanism or the accumulator register.

It is an additional object of the present invention to provide an arrangement for a smooth and unobstructed transmission of the digital motion of the actuator as determined by the selection mechanism of a calculating machine to a movable transmission mechanism and from there to the accumulator register, no matter what the ordinal position of said transmission mechanism relative to said selection mechanism and to said accumulator register may be.

It is another specific object of the present invention to provide a calculating machine of the type referred to, in which lateral displacement of the movable transmission mechanism, relative to the stationary selection and actuating mechanism and to the stationary accumulator register may be effected without any risk of obstruction, such as may occur by unavoidable variations in alignment between the gears of the transmission mechanism and the accumulator register.

The manner in which the above and other objects of the invention are accomplished will be readily understood from the following specification when read in conjunction with the accompanying drawings, wherein Fig. 1 is a perspective view of a calculating machine embodying the present invention;

Fig. 2 is a vertical longitudinal section illustrating the keyboard for selecting a value, the actuator mechanism, the accumulator mechanism, and the counter mechanism;

Fig. 3 is a section taken along the line 3—3 of Fig. 2, showing the typical construction and mounting of a key;

Fig. 4 is a perspective view of a keyboard check dial;

Fig. 5 is a section taken substantially along the line 5—5 of Fig. 2, illustrating the shiftable transmission and the means for driving the same;

Fig. 6 is a section taken along the line 6—6 of Fig. 2, illustrating details of the shiftable transmission;

Fig. 7 is a section taken along the line 7—7 of Fig. 5, showing the gear connections for certain of the transmission shafts;

Fig. 8 is an enlarged partial section taken substantially along the line 8—8 of Fig. 2, illustrating the accumulating and tens-transfer mechanisms, with the tens-transfer mechanism partly through its cycle of operation;

Fig. 9 is a transverse section taken along the line 9—9 of Fig. 8, illustrating one of the transfer units;

Fig. 10 is a section through the same unit, taken along the line 10—10 of Fig. 8;

Fig. 11 is a transverse section taken along the line 11—11 of Fig. 8, illustrating one of the differentially driven accumulator dials and the pawling means therefor;

Fig. 12 is a section taken along the line 12—12 of Fig. 8, illustrating a transfer unit different from that shown in Figs. 9 and 10;

Fig. 13 is a full size vertical section through the accumulating and counter registers, illustrating the transfer levers and transfer units associated therewith.

Fig. 14 is a vertical section through the accumulator and counter mechanisms, illustrating the clearing mechanism;

Fig. 15 is a section taken along the line 15—15 of Fig. 18, illustrating the means operated by the clearance drive for releasing the dial pawls;

Fig. 16 is a section taken along the line 16—16 of Fig. 26, illustrating the means operated during tens-transfer operation for releasing the dial pawls;

Fig. 17 is a schematic development of the tens-transfer assembly, illustrating the cross-over staggered relation of the transfer teeth;

Fig. 23 is a section taken substantially along the line 23—23 of Fig. 18;

Fig. 24 is a section taken through the forward part of the machine, illustrating the manual drive connection for the shift mechanism;

Fig. 25 is a section taken along the line 25—25 of Fig. 24;

Fig. 26 is a developed section taken along the left side of the machine, illustrating the drive for the actuator, accumulator, transfer mechanism, and counter mechanism;

Fig. 26A is a section through one of the reversible drive clutches;

Fig. 27 is a transverse section taken along the line 27—27 of Fig. 26;

Fig. 28 is a section taken along the line 28—28 of Fig. 26, illustrating the lost motion connection in the drive for the accumulator mechanism;

Fig. 29 is a section taken along the line 29—29 of Fig. 28;

Figs. 30 and 31 are sections taken through one of the reversible drive clutches;

Fig. 32 is a longitudinal, vertical section taken substantially along the line 32—32 of Fig. 26, illustrating the multiplier control section and the drive for the accumulator transfer assembly and counter mechanism;

Fig. 33 is a section taken substantially along the lines 33—33 of Fig. 32;

Fig. 34 is a detail section taken along the line 34—34 of Fig. 32;

Fig. 35 is a section taken through the add and clear bar mechanism for releasing depressed keys;

Fig. 36 is a detail section taken along the line 36—36 of Fig. 35;

Fig. 37 is a section showing the counter reverse control;

Fig. 38 is a section illustrating the keyboard lock and means for operating the same;

The machine of the present invention is of the key-set type in which means are provided for first setting up one factor of a calculation on a keyboard and subsequently operating the machine under power, preferably derived from a crank, in a manner indicated by the character and amount of another factor of the calculation.

Key-set mechanism

Figure 1:
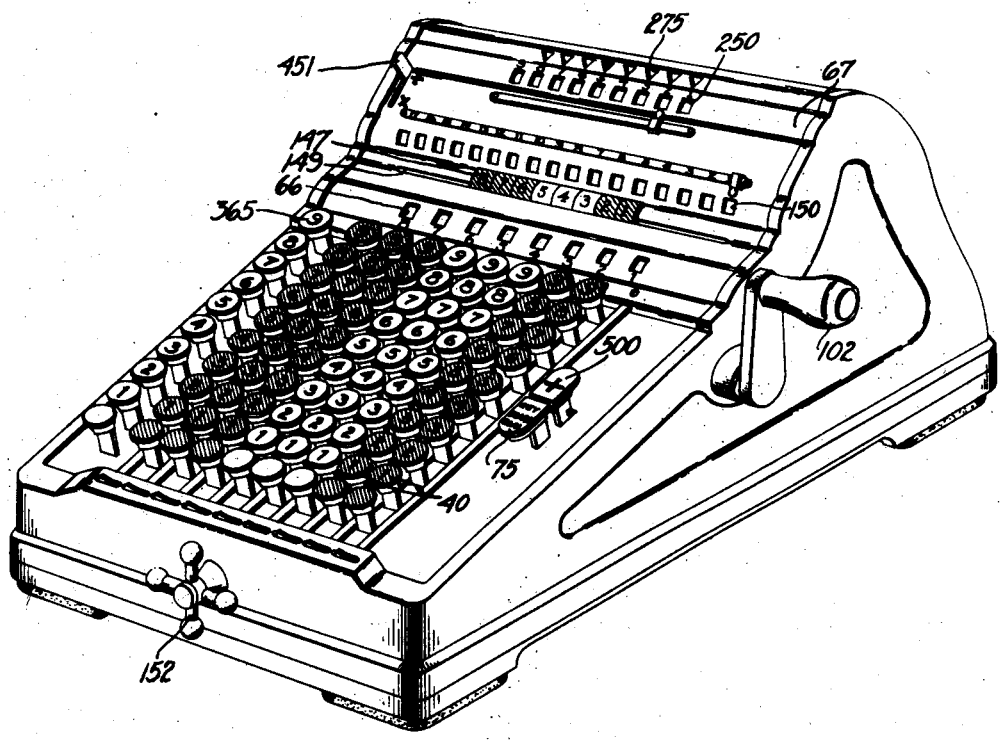
Figure 19:
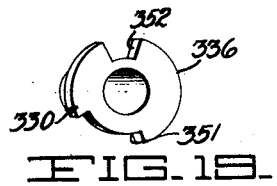
Fig. 19 is a perspective view of one of the clutch members forming part of the drive of the clearing mechanism for one of the registers.

In a machine designed for calculation in the decimal system, the keys are preferably arranged, as shown in Fig. 1, in a series of banks of ten keys each, the number of banks provided in the machine depending upon the magnitude of the factor with which the machine is designed to deal.

As indicated, each key bank or section comprises a row of value keys 40, the key stems 43 (Figs. 2 and 3) of which are slidably mounted in a channel-shaped key frame 41, and normally maintained in raised position by suitable coil springs 42. The key stems 43 are assembled into the channel frame 41 from the top, the slots in the upper flange of the channel frame being of sufficient width to pass camming projections 44 formed on the key stems 43. After insertion of the key stems, a retaining strip 45 is secured in place by screws 46, thus preventing withdrawal of the keys.

Each key section is mounted in the machine between a cross channel member 47 and a cross bar 48, forming part of the stationary framework of the machine. The rear ends of the channel members 41 are provided with slots 49 which are fitted over the upper flange of the channel member 47, enabling lengthwise adjustment of the key sections. After assembly of the various key sections, they are aligned with each other by means of set screws 50 threaded in the cross bar 48 and abutting each channel 41. The key sections are then secured in place by screws 51. After assembly of the key sections, decimal markers 52, having finger pieces 53 formed on the forward ends thereof, are journaled between adjacent key banks. As is well known, one side of each of these markers is colored to correspond with the coloring of the top of channels 41, while its other side is colored to contrast therewith, so that by turning the selected markers, the keyboard may be set off in any desired manner.

Disposed beneath the camming projections 44 of the key stems 43 in each bank of keys is a differentially settable bar 54 having elongated slots 55 formed therein and slidable along bearing screws 56 secured to the side of the channel 41. This bar 54 is provided with a series of camming surfaces, one located adjacent each key stem 43. Each of these camming surfaces, as at 58 and 59, is arranged at an angle different from that of any other of the camming surfaces, whereby depression of any one of the value keys 40 will cam the bar 54 rearward an amount different from that produced by depression of any other of the value keys. As illustrated in Fig. 2, each bar 54 is urged forwardly by a tension spring 60 extending between a lug formed on the bar 54 and a lug formed on the channel 41.

At the rearward end of each bar 54 is a vertically extending slot 61 in which rides a pin 62 secured to the lower end of a check dial lever. This lever is pivoted on a cross rod 63 extending the width of the machine and supported by the channel members 41. An arcuate check dial 64 (Fig. 1) is formed on the upper end of each check dial lever. Arranged on the upper surface of each dial 64 is a series of numerals 65. These numerals are so connected as to form a condensed series of numbers from "zero" to "nine."

The camming surfaces 58, 59, et cetera, formed on each differentially settable bar 54 are so arranged as to cause the associated dial 64 to exhibit a numeral representing the value of the key depressed. This numeral will be visible through an opening 66 formed in a cover plate 67 which forms part of the stationary framework of the machine. For example, on depression of the number "3" key the check dial 64 will be moved to a position wherein the section extending between the dotted lines 68 of Fig. 4 will be visible through the opening 66.

The manner in which the check dials 64 are mounted on the key section frame so as to form a unitary key section assembly is particularly advantageous from the production point of view, in that the variables between the value keys 40 and the check dials 64 can be far better controlled in this way than if the check dials 64 were constructed to form a separate unit mounted on the machine frame. Among other advantages, proper lineup of the check dials with respect to the sight openings 66 (Fig. 2) is greatly facilitated.

All of the key stems 43 in each bank, except the front one, are of the same length. Each has a cam projection 70 which, on depression of the key, pushes a slotted key-locking slide 71, slidably supported on the lower side of the channel 41, to the right, as viewed in Fig. 2, thereby releasing any other latched-down key in the same section. Upon full downward depression of any value key stem, this slide, urged forward by a compression spring 72, snaps back into its initial position and by overlying the upper edge of the projection 70, latches the depressed key.

The leftmost key (Fig. 2) in each section, is the zero or clear key, and is provided for the sole purpose of releasing any latched-down key in the same section or bank. The cam projection 70 of this key is identical with that of the other keys of the section, but latching down of the zero key is prevented by the provision, on the locking slide 71, of a lip 73, the lower edge of which extends below the lowermost position assumed by the top of the projection 70. Hence, while the slide is moved to the right upon depression of this key for the purpose of unlatching any latched-down key, the lip 73 prevents it from returning leftward during the depression of the key, and latching of the key cannot be effected.

Besides the individual zero or clear key for each key bank described above, a main clear key 75 (Figs. 1 and 25) is provided, which, upon depression thereof, will release every depressed key on the entire keyboard. This key 75 is slidably mounted for vertical movement on a pair of pins 76 and 77 suitably secured to the machine frame. Key 75 is normally held in a raised position by a tension spring 78 and has a lug 79 formed on the lower end thereof which, upon depression of the key, engages and rocks a bellcrank 80, pivoted on a pin 81, against the action of a tension spring 82. The upper end of bellcrank 80 is connected by a link 83 to a clear gate 84 extending the entire width of the keyboard and pivoted on studs 85 supported by the side frames of the machine. The upper portion of the gate 84 extends directly in front of each of the locking slides 71 (Fig. 2).

Thus, whenever the clear key 75 is depressed, the gate 84 will be rocked clockwise to release any latched-down key. Under some conditions, the keyboard is cleared automatically by rocking this gate, as will be described hereinafter.

As illustrated in Figs. 2 and 3, each of the key stems of the value keys 40 is slotted at the lower end, to form two spaced legs 86, which straddle the reduced portion 88 of a gear member 89 slidable along a square shaft 91, and having formed thereon a spur gear 90. Each shaft 91 is aligned directly below its associated key section, and is journaled in bearings 92 and 93 provided in the cross channel member 47, and in a supporting plate 94, respectively.

The legs 86 of each key stem are bent slightly forward, so that upon depression of a value key into its latched position, as indicated by the dotted lines 40', the legs 86 engage the rear edges of the reduced portion 88 on the associated gear member 89, and move the member rearwardly along the shaft 91 until the gear 90 is positioned in meshing relation with an adjacent actuator gear 96 secured on a second square shaft 95 situated directly below the shaft 91 and journaled in bearings 97 and 98 also provided in the channel member 47 and supporting-plate 94, respectively.

*Actuator mechanism*

The actuating mechanism of the present invention embodies the well-known Thomas type principle of intermittent actuation. However, it differs from prior actuators of this type in that it permits reversible operation of the actuators, enables the key-set selection mechanism described above to be employed, and furthermore is very economical to manufacture.

The series of actuator gears 96 in each key section have graduated numbers of teeth, the gear 96 adjacent the #1 value key having one tooth, the gear adjacent the #2 key having two teeth, et cetera, up to the last or rearmost gear 96 which has nine teeth. In contrast to this arrangement, the selector gears 90 all have the same number of teeth which, in this case, is nine. Thus, upon depresssion of a value key in any bank and subsequent rotation of the shaft 95 for one revolution in a manner described hereinafter, a rotation will be imparted to the shaft 91, the amount of which depends upon the value key depressed. It should be noted that the various gears 96 are so arranged on the shafts 95 that their teeth are symmetrically distributed about a vertical plane passing through and along the axis of the shafts 95 when the machine is in its illustrated full cycle position.

With the actuators disposed directly beneath the individual key sections, as shown in Figs. 2 and 3, it is possible to dispense with the usual linkage connections between the various key sections and their associated actuators. Linkage connections of this type generally require a variable stroke for the different value keys depressed, and this causes an uneven key touch which is particularly noticeable between lowest and highest value selections. Furthermore, such linkage connections require critical adjustment. The present invention overcomes this difficulty entirely, in that all the gears 90 are shifted the same amount to bring them into engagement with their associated actuator gears 96, and thus an absolutely even key touch is obtained over the entire keyboard.

The various actuator shafts 95 have gears 99 on their rearmost ends, which gears mesh with similar gears 100 secured on a main actuator shaft 101, the latter extending across the machine and being journaled in bearings 102 and 102' (Fig. 5) mounted on brackets extending from the channel member 47.

Actuator transmission mechanism

The present invention provides an actuator transmission that is shiftable relative to the registering mechanism, thereby enabling the registering mechanism to be stationarily supported in the machine, instead of being carried by a carriage which is shiftable relative to the machine. Since this shiftable transmission may be situated well within the confines of the machine (instead of on the exterior thereof as is the case with machines wherein the registers are supported by shiftable carriages) the noise incident to such shifting operations may be minimized, and the registering mechanism may be arranged to present a symmetrical, well balanced appearance.

The shiftable transmission, or carriage, is generally indicated at 103 (Figs. 2, 5 and 6) and is operated by the various actuators, in a manner hereinafter described, to transmit actuation to different denominational orders of the actuator register.

The transmission 103 is supported for shifting movement laterally of the machine by a worm shaft 104, and by a plurality of drive shafts 105 equi-spaced from each other and arranged equidistant from the worm shaft 104, as shown in Fig. 7. The worm shaft 104 is supported at opposite ends thereof in bearing sleeves 106 and 107 secured in end plate assemblies 108 and 109, respectively. Each of these end plate assemblies comprises a pair of plates 110 and 111 held apart by suitable spacers as at 109'. Spacer rings 110' are fitted over the sleeves 106 and 107 intermediate the plates 110 and 111 to also aid in holding the plates in their correct spaced-apart positions. The entire shiftable transmission 103, as well as the end plate assemblies 108 and 109, are supported for a slight vertical movement, by arms 112 and 113 (Fig. 5) rockably mounted at their rearmost ends on frame studs 114 which are secured to end plates 115. Each of the arms 112 and 113 has an enlarged forward annular portion in which the respective sleeves 106 and 107 are secured, a sleeve 106 being shown in section in Fig. 6.

In order to raise and lower the shiftable transmission 103, a rotatable cam shaft 116 is provided, extending across the machine and also journaled in the end plates 115. Two pairs of complementary cams 117 and 118 (Figs. 2, 5 and 23) are mounted on the cam shaft 116, one pair at either end thereof, and each pair is engaged by cam followers 119 and 120, depending from each of the arms 112 and 113. The cam shaft 116 is driven in a manner described hereinafter, and the timing is such that, when the machine is in full cycle position, a lobe 121 on each of the cams 118 engages a roller 120' on the cam follower 120 and thereby moves the arms 112 and 113, as well as the slidable transmission 103, into a slightly dipped position as shown in Fig. 2. In this position of the transmission 103, transmission gears 122, forming a part thereof, are out of close mesh with gears 123 forming part of the accumulator register gear train. However, the gears 122 and 123 in each order of the shiftable transmission 103 are not completely out of mesh with each other; they are merely sufficiently separated to allow the transmission 103 to be shifted sideways. At the beginning of a machine operation the cam 117 immediately rocks the cam follower 119, and consequently the arms 112 and 113, to bring the transmission gears 122 into close mesh with gears 123, thereby insuring quiet and accurate operation of the machine during the succeeding actuation.

The different drive shafts 105 are connected to different ones of the intermittently operated shafts 91 by flexible shafting and gearing. The number "four" shaft 91 (Fig. 5), counting from the right side of the machine, has secured thereto by means of a sleeve 139, a flexible shaft 124, which is secured at the other end in a socket formed in a gear 125 having hubs thereof journaled in the two plates 110 and 111 of the end plate assembly 108. The flexible shafts may be held in position by any well known means such as clamps or anchor bearings, not shown, so as to prevent interference of the shafts with the slidable transmission 103, and also to prevent whip of the shafts when the direction of rotation thereof is reversed. Gear 125 (Figs. 5 and 7) meshes with a similar gear 126, having hubs journaled in bearings formed in the plates 110 and 111, and having secured thereto one of the shafts 105; the other end of this shaft is secured in a sleeve 127 journaled in bearings formed in the end plate assembly 109. The various other shafts 91 are similarly connected to their associated drive shafts 105. However, the rightmost four shafts 91, representing the keyboard orders "one" to "four," are connected to gears located on the end plate assembly 108, while the leftmost four shafts 91, representing the keyboard orders "five" to "eight," are connected to gears located on the left endplate assembly 109. Furthermore, to enable close spacing of the shafts 105, certain pairs of the gears (as 125 and 126) are positioned between the plates 110 and 111 of the endplate assembly 108 or 109, while other pairs of gears, for example gears 128 and 129 (Fig. 7) are located outside of the plates 111.

The shiftable transmission 103 comprises a pair of end plates 131 and 132 between which are spaced a plurality of plates 133. These various plates are mounted on and secured to a sleeve 134 (Fig. 6) which is threaded at its right-hand end to fit the threads of the worm shaft 104. The various plates 131, 132 and 133 are held in spaced relation with each other by spacer combs 136 (Fig. 2) interlocking with slots in the various plates and held in locking position by rods 137. Each end plate has a plurality of bushings 138 journaled therein and registering with the drive shafts 105. The bushings 138 have square openings therein adapted to fit the square shafts 105, so as to guide the transmission along the latter.

Interposed between the various plates 131, 132 and 133 and journaled on the sleeve 134 is a plurality of main transmission gears 122. As described hereinbefore, these gears mesh with the gears 123 driving the various accumulator register units, and are equi-spaced from each other a distance equal to the spacing between the gears 123. Thus, each of the gears 122 can be directly aligned with one of the gears 123.

Splined to each drive shaft 105 and located intermediate two of the spacer plates 133 is a gear 140 meshing with an associated transmission gear 122. These gears 140 are so located that each will rotate the transmission gear 122 in that order of the transmission 103 corresponding to the order on the keyboard in which such rotation was instituted. For example, the number "four" actuator gear 122, counting from the right side of the transmission 103, meshes with a gear 140 splined to the shaft 105 that is driven (through gears 125 and 126 and flexible shaft 124) from the shaft 91 associated with the number "four" key bank.

In order to prevent inadvertent rotation of the gears 122 when they are not being actuated, as well as to insure against interference of the teeth of those gears with the teeth of gears 123 during a shift of the transmission 103 from one position to another, means are provided for pawling the various gears 122. To this end, a helical tension spring 145 (Figs. 2, 5 and 6) is passed through aligned openings in the various plates 133 and is secured in similar aligned openings in the end plates 131 and 132. When the gears 122 are at rest, the spring 145 lies between adjacent teeth thereon, as shown in Fig. 2, and therefore yieldably restrains the gears from rotation.

Extending upwardly from the two end plates 131 and 132 of the shiftable transmission 103 are a pair of brackets 146 (Fig. 2). An indicator plate 147 (Figs. 1 and 2) is secured to the brackets 146 by screws 148 and extends through a slot 149 to apprise the operator of the lateral position of the actuator transmission 103 at all times. The plate 147 has a series of numerals thereon corresponding to the orders of the keyboard and spaced apart a distance corresponding to the spacing of the transmission gears 122 so as to indicate the orders of the accumulator register (visible through openings 150) into which values set up in the various correspondingly numbered orders of the keyboard will be entered.

To readily correlate a key bank with the corresponding accumulator dial into or from which a value is to be added or subtracted, with the shiftable transmission 103 in a particular position, the various sections of the key columns are colored differently, and the columnar numbers on the indicator plate 147 are each identified with the same color as the corresponding key column. For example, if the keys 40 in the two right-most banks, as viewed in Fig. 1, are colored green, the next three adjacent banks colored yellow, and the three next banks colored green, then the two lowest numbers on the indicator plate 147, representing the two right-most key columns, would be disposed on a green field, the next three numbers representing the yellow keys would be disposed on a yellow field, and the next three and highest numbers would be disposed on a green field. Thus, using the colors to guide him, the operator can at a glance, correlate the key banks and the corresponding accumulator dials, visible at 150, into or from which values set up in particular key columns would be entered or subtracted with the shiftable transmission 103 in a certain position.

*Shift mechanism*

As stated hereinbefore, the transmission 103 is shiftable transversely of the machine to enable factors set up in the various banks of the keyboard to be added to or substracted from different orders of the accumulator register.

To provide for this function, a manually operable shift handle 152 (Figs. 1 and 24) is provided at the front end of the machine. Handle 152 is secured to a short shaft 153 which is journaled in a bearing sleeve 154 mounted on a supporting plate 155 and is also journaled in a second supporting plate 156. A spur gear 157 (Figs. 24 and 25) is secured to the shaft 153 and meshes with a pinion 158 secured on a shaft 159 extending longitudinally of the machine. A centralizing disc 160 is suitably secured to the gear 157 and has three equi-spaced indentations formed thereon and adapted to be engaged by a roller 161 mounted on a lever 162 suitably pivoted to the supporting plate 155 at 162'. Lever 162 is pulled downwardly to press the roller 161 against the periphery of the disc 160, by a tension spring 163.

Gearing, to be presently described, connects the shift handle 152 to the worm shaft 104 (Fig. 5) for the purpose of shifting the transmission 103 from one position to another, and is so arranged that one of the indentations on the disc 160 will be engaged and centralized by the roller 161 whenever the transmission 103 is in one of its different positions of rest.

The shaft 159 (Figs. 2 and 23) is journaled at its rearmost end in a bearing formed in a bearing bracket 165 which is suitably secured by screws 166 to a cross piece forming part of the machine base 167. Secured to the shaft 159 is a spiral gear 168, which meshes with similar spiral gear 169 to a cross shaft 170. Shaft 170 is journaled at one end in a bearing formed in the bearing bracket 165 and at the other end in a bearing formed in the supporting plate 115. It has secured thereon (Figs. 5 and 23) a spur gear 172 meshing with a second spur gear 173 journaled on a bearing stud 174 extending from the supporting plate 115. Gear 173 drives a pinion 175 secured to the worm shaft 104, as shown in Fig. 6, and extends in close mesh with this pinion when the transmission 103 is in its dipped position. As the sleeve 134 is moved along the worm 104, due to rotation of the worm, the various bushings 138 (Fig. 5) in the end plates 131 and 132 of the shiftable transmission 103, as well as the various pinions 140 (the latter restricted against longitudinal movement relative to the transmission by the plates 133) slide along their respective drive shafts 105.

*Accumulator mechanism*

In contrast to the transversely shiftable accumulator or product registers usually provided on calculating machines of this character, the machine of the present invention employs a stationary accumulator. Thus, the overall width of the machine is maintained at a minimum, and the noise incident to shiftable accumulator register carriages may be dispensed with. A further advantage of this type of stationary accumulator is that distraction of the operator caused by the bodily shifting of the accumulator dials is eliminated.

As was stated heretofore, the accumulator register comprises a series of numeral dials representing successively higher denominational orders, which dials are visible through openings 150 (Figs. 1 and 2) in the cover plate 67 of the machine, and which are driven through individual gear trains, including the gears 123.

A plurality of brace plates 177 (Figs. 2, 8 and 13), are equi-spaced along the inside of the cover plate 67 and supported at their lower extremity is a cross rod 178 extending the width of the machine. The various gears 123 are rotatably mounted on this rod 178 and mesh with gears 179 secured to the hubs of sun gears 180 journaled on a cross rod 181, also supported by the various plates 177. Each sun gear 180 meshes with diametrically opposed planet gears 182 (Figs. 8 and 11) journaled on pins 183 secured to a disc 185 freely mounted on the hub of the sun gear 180. The disc 195 is provided with a plurality of serrations 196 (Fig. 11) engaged by a pawl 187 supported on a shaft 188 to prevent rotation of the disc during digitation. Each pawl 187 is pivotally mounted on a spool 1187 fixed on the shaft 188 and has a pin 1188 extending therefrom, which pin is engaged by an arm 1189 secured to the shaft 188 at all times except during tens-transfer and clearance of the dials, to positively lock the disc 195 from rotation. A leaf spring 1190 is secured to the shaft 188 by a small screw 1191 and engages the under surface of pin 1188 to yieldably urge the pawl 187 into engagement with the disc 195 when the arm 1189 is removed from contact with the pin 1188. Under certain conditions, during transfer of tens, and during clearance of the dials, as will be explained hereinafter, the shaft 188 will be rocked clockwise a limited amount, removing the arm 1189 from the pin 1188 but enabling the spring 1190 to still yieldably hold the pawl 187 against the disc 195. With the parts so arranged, the disc 195 may be rotated but the pawl 187 will effect centralizing of the same when it comes to rest, and will also tend to prevent overthrow due to momentum of the dial assembly.

Each of the planet gears 182 has a second set of gears 184 carried thereby and meshing with a second sun gear 190 also freely rotatable on the shaft 181. Secured to the hub of the sun gear 190 are, in turn, a transfer lever knock-out cam 191, a mutilated clearing gear 192, a transfer gear 193, a dial shell 194, and a supporting disc 195 for the shell 194. To secure the various elements on the sun gear 190 together, a pin 197 may be passed through the gears 192 and 193, as well as through the dial shell 194 and disc 195. The periphery of the dial shell is sufficiently wide to accommodate equi-spaced numeral digits ranging from "0" to "9."

The gearing interconnecting the various shafts 91 (Fig. 2) with the various dial shells 194 is so arranged that, upon each one-ninth of a revolution of a shaft 91, the respective dial 194 arranged to be driven thereby will be advanced one-tenth of a revolution or from one numeral to the next. For example, if the number "five" numeral key 40 of a particular key section is depressed, one revolution of the associated actuator shaft 95 causes the respective gear 96 to impart five-ninths of a revolution to the corresponding gear 98 to advance the dial shell 194 driven thereby through five numerals.

A positively operated gate (not shown) or individual spring pressed pawls (not shown) are preferably provided to lock the gears 179 against inadvertent rotation after having been advanced during digitation. Since such means is old and well known in the art as indicated in the United States patent to Lerch, No. 1,927,269 issued September 19, 1933, it is not necessary to show the details of it herein.

*Tens-transfer*

For the purpose of advancing a next higher order dial one-tenth of a revolution, whenever the lower adjacent dial has moved from "9" to "0" in an additive direction, or for retracting the higher order dial one-tenth of a revolution whenever the adjacent lower order dial has moved from "0" to "9" in a subtractive direction, a tens-transfer mechanism is provided. This mechanism comprises a tens-transfer shaft 200 (Figs. 2, 8, 9, 10, 12, 13), which is driven in a manner hereinafter described and which carries a plurality of transfer units generally indicated at 201, 202, 203, et cetera, one for each accumulator dial assembly. This shaft 200 remains stationary during digitation, but during the latter part of the cycle it is rotated through one complete revolution, and during this rotation the various transfer units thereon will cause a tens-transfer to any accumulator dial if the next lower dial has moved from "9" to "0" in an additive direction, or from "0" to "9" in a subtractive direction.

Referring to Figs. 8 and 12, the shaft 200 is square and each of the transfer units 201, etc., with the exception of those to the left of a unit 201' (Fig. 17), comprises a sleeve 231 splined to the shaft 200. Secured to the sleeve 231 is a guide 207 in the form of a stamping having a hub 208 formed thereon which is firmly pressed on the sleeve 231. Each guide 207 except the one attached to the unit 201' (which will hereinafter be termed the "common transfer unit") and all those to the left thereof, has two radially extending slots formed therein which guide a pair of transfer teeth or keys 210 for endwise sliding movement longitudinally of the shaft 200. Each tooth 210 is also slidable in a radial slot formed in a guide plate 206 secured on the lefthand end of the sleeve 231. A compression spring 211 is interposed between the plate 206 and a shoulder 209 formed on each tooth 210 to normally press the teeth to the right, as viewed in Fig. 8.

It will be noted that each tooth 210 has an inclined edge 212 formed thereon which, when the tooth is moved to the left against the action of the spring 211, moves into meshing relation with a gear 213 journaled on a shaft 214 which is supported by the various plates 177 and which extends across the machine. The gears 213 mesh with the heretofore mentioned tens-transfer gears 193 secured to the respective dials 194.

Each transfer tooth 210 has an inclined edge 218 opposite to edge 212 and this edge 218 is normally in the path of a rounded tip 215' formed on the lower end of a transfer lever 215 (Figs. 8 and 13). Said lever 215 is pivoted on a cross rod 220 supported by the various plates 177, and has an elongated slot 216 formed therein and extending over a spacer sleeve 214' on the shaft 214 whereby the lever may be swung in a limited arc about the rod 220. A hair pin spring 221 is secured to a pin 222 extending from the lever 215 adjacent the offset tip 215' thereof and embraces the sleeve 214' on the shaft 214 so as to yieldably hold the lever 215 in either of two extreme end positions.

In full cycle position of the machine, or whenever no transitional carry is to be effected, each transfer lever 215 is maintained in the position illustrated in Fig. 13, with a forwardly extending point 223 thereon closely adjacent the periphery of the heretofore mentioned knock-out cam 191 secured to the dial shell 194. As the respective dial is rotated from "0" to "9" in one direction or from "9" to "0" in an opposite direction, a lobe 224 formed on the knock-out cam 191 engages the point 223 of the lever 215 and thus moves this lever counterclockwise to position its rounded tip 215' in the path of one of the transfer teeth 210 of the transfer unit for the next higher order dial assembly. Upon subsequent rotation of the transfer shaft 200 a transfer tooth 210 will engage the extended tip 215' and, due to the inclined surface 218 thereof, as well as to the rounded portion of the tip 215', the tooth 210 will be moved to the left into meshing engagement with the respective gear 213. Continued rotation of the shaft 200 will cause the carry tooth 210 (now in mesh with the associated gear 213) to advance the gear 213, and consequently the respective dial shell 194 one increment, or from one numeral to the next.

It is to be noted that, due to the inclined surfaces 212 and 218 of the various transfer teeth 210, as well as to the rounded contour of the tips 215' of the transfer levers 215 and the curved contours of the teeth of the gears 213, the teeth 210 need not be entirely meshed or engaged with the gears 213 before beginning their advancing movement.

Each of the transfer units 201, etc. to the right of the common transfer unit 201' (as viewed in Fig. 17) has a transfer lever return cam 225 securely mounted on an annular member 205 (Fig. 8) which, in turn is suitably secured on its respective sleeve 231. Each of the cams has a lobe capable of engaging the pin 222 on the associated transfer lever 215, to return this lever to its original position illustrated in Fig. 13, after a transfer has occurred in the respective order, regardless of which direction the shaft 200 is rotated.

The construction of the transfer units 202, 203, etc. to the left of the common transfer unit 201' is shown in Figs. 8, 9, and 10. This construction is somewhat similar to that of the units to the right of unit 201'; however, only one transfer tooth 210 is provided for each of these latter units. Furthermore each guide 207' is mounted on an annular sleeve 230 which is freely mounted for rotation on a second sleeve 204, splined to the shaft 200. A pin 232 extends through the hub 208' of each guide 207' and through the annular sleeve 230 and rides in a slot 233 formed in the inner sleeve 204. The lengths of the slots 233 in the various units to the left of the unit 201' (Fig. 17) vary from a minimum in the transfer unit immediately to the left of unit 201' to a maximum in the transfer unit at the extreme left of the transfer assembly.

Due to the lost motion of the pins 232 in the respective slots 233, those transfer teeth 210 to the left of the unit 201' can lag behind a certain amount, upon rotation of the shaft 200.

Considering the developed view of Fig. 17, additive operation of the machine will effect movement of the entire transfer assembly mounted on the transfer shaft 200 in the direction of the arrow A, while subtractive operation of the machine will effect movement of the transfer assembly in an opposite direction or in the direction of the arrow S.

Now the various teeth 210 in the transfer units to the right of the tooth of unit 201' are arranged in two helical rows diverging from the single tooth of the unit 201' which tooth is common to both rows. Also, the hereinbefore mentioned slots 233 (Figs. 8 and 10) in the various transfer units to the left of the transfer unit 201' are of such lengths that, as the shaft 200 is rotated to move the transfer assembly in the direction of the arrow A, the teeth 210 of these latter mentioned transfer units will, by virtue of a drag means to be described, assume the positions illustrated in full lines in Fig. 17, wherein they form a continuation of one of the two mentioned helical rows of transfer teeth. When the shaft 200 is rotated to move the transfer assembly in the direction of the arrow S, the slots 233 will allow the various transfer teeth of the units to the left of the unit 201' to assume the positions illustrated in dot-and-dash lines in Fig. 17, wherein they form a continuation of the other of the two mentioned helical rows of transfer teeth.

As indicated diagrammatically in Fig. 17, all of the floating transfer units 202, 203, etc. to the left of the rigidly mounted common transfer unit 201', as well as this unit 201', are provided with floating transfer lever return cams 225'. Each of these cams 225' is capable of being rocked from one side of its adjacent transfer tooth 210 to the other a limited amount. This provision enables the cams 225' to return the respective transfer levers 215 (Figs. 8 and 13) to their original positions (provided they have been moved therefrom by cams 191) only after a transfer has taken place and regardless of the direction of movement of the transfer assembly. To effect this lost motion connection between the floating cams 225' and their respective transfer units, each floating cam is rotatably mounted on an annular member 205' rigidly secured to the associated sleeve 230 or 231 in the case of the common transfer unit 201'. A bearing washer 607 is interposed between each member 205' and a collar 608 riveted to the associated supporting sleeve.

As shown in Figs. 8 and 9, each of the floating cams 225' has an extended notch 226 formed therein, into which extends a lug 227 formed on the adjacent member 205'. The notch 226 is so arranged that the return cam 225' may be moved to one side or the other of its respective transfer tooth 210.

Referring to Figs. 8 and 9, a frictional drag assembly, generally indicated at 600, is provided to cause each floating transfer cam 225' to remain stationary after the shaft 200 starts to rotate, until the lug 227 abuts the trailing end of notch 226, and until the pin 232 (Fig. 10) abuts the trailing end of slot 233, if such has not previously occurred. Therefore, this drag assembly insures that both the floating transfer units and the floating cams 225' will assume their correct positions, as shown in full lines in Fig. 17, when the machine operates in an additive direction to move the transfer assembly in the direction of the arrow A, and it also insures that these elements will assume their illustrated dot-and-dash line positions when the transfer assembly is moved in the direction of the arrow S.

The assembly 600 includes an angle bar 601 (Figs. 2, 8 and 9) extending between the side frames of the machine and supported thereby. This bar has a series of lugs 602 extending therefrom, each aligned with one of the floating cams 225'. A pair of leaf springs 603 are secured to each lug 602 by a rivet 604, and they extend into frictional engagement with the opposite sides of the aligned floating cam 225' to effect a drag on this cam.

Due to the special, cross-over, staggered relation of the various transfer teeth 210 (Fig. 17) the tens-transfer portion of the operating cycle may be reduced, enabling a slower speed of operation of the driving elements during digitation as well as rendering it possible to reduce the over-all diameter of the transfer assembly mounted on the shaft 200. Both of these factors tend toward an extremely quiet construction.

The operation of the carry mechanism is as follows: Assume, for example, that an unbroken series of nine's appears on the various accumulator dials 194 and that the number "4" is to be added into the right-hand or number "1" order dial. Now as the accumulator dial in the number "1" order is rotated from "9" through "0" to "3" during digitation, the cam 191 (Figs. 8 and 13) in the number "1" order will rock its associated transfer lever 215 into transferring position as has been described hereinbefore. Therefore, upon subsequent rotation of the transfer shaft 200 during the latter part of the current cycle to effect transfer, the number "1" order transfer lever 215 will be impinged by its associated transfer tooth 210, indicated as the lower tooth 210 in the number "1" column of Fig. 17. The lower tooth 210 will become active to effect a transfer because of the fact that the transfer assembly is moved in the direction of the arrow A during additive operations and therefore the lower tooth 210 will strike the associated lever 215 first.

Thus the lowermost tooth 210 of the number "1" column (Fig. 17) will be shifted leftward to effect rotation of the number "2" order accumulator dial from "9" to "0" in the manner described hereinbefore in connection with Fig. 8. Since this action causes the knock-out cam 191 in the number "2" order to throw its associated transfer lever 215 into transferring position, the lowermost tooth 210 in the associated order (number "2" column of Fig. 17) will now strike this lever 215 and consequently be moved to the left to cause a partial rotation of the number "3" order accumulator dial from "9" to "0."

Due to the fact that, as before stated, the various teeth 210 to the left of the common transfer unit 201' will be arranged as shown in the full lines of Fig. 17 during additive operations, the above mentioned carry operation will continue sequentially from order to order to the left until the leftmost accumulator dial is reached, providing the series of nines originally extended completely across the accumulator. Thus, instead of a series of nines a series of zeros will appear on the dials 194.

When the transfer assembly has moved through one-half of a revolution the fixed transfer lever return cams 225 on those orders to the right of the common transfer unit 201' will strike their associated transfer levers 215 to remove the same from transferring position before the upper helical series of teeth 210, illustrated in Fig. 17, pass the camming edges of levers 215. Also since the floating transfer lever return cams 225' on those units to the left of and including the common transfer unit 201' are allowed to lag behind their respective teeth 210, these cams 225' will operate to return their respective transfer levers from transferring position shortly after the respective teeth 210 have effected a carry movement.

*Counter mechanism*

A counter mechanism comprising a series of dials 251 (Fig. 26), visible through openings 250 (Figs. 1 and 2) in the cover plate 87, is provided so that the number of operations performed in addition or subtraction may be registered, the mechanism also serving as a multiplier register in multiplication operations, and a quotient register in division operations.

Each counter dial 251 (Figs. 2 and 26) has numeral digits, ranging from "0" to "9," provided in equi-spaced relation around its periphery and is secured to a flanged hub 254 freely mounted on a cross rod 255 supported by the various brace plates 177 and extending across the machine. Secured to the hub 254, as by a pin 256, are a gear 252 and a mutilated clearance gear 253. Gear 252 meshes with a gear 257 freely mounted on a second cross rod 258 also supported by the brace plates 177. One of the counter dials 251, depending upon the position of the shiftable transmission 103, is adapted to be driven one increment for each complete machine cycle by a counting finger 259 which is adapted to engage and advance the gear 257 aligned therewith an increment of one tooth. The rearmost portion of the counter finger 259 is journaled on an eccentric portion 260 of a sleeve 262 splined to a square drive shaft 261. Shaft 261 is rotated one complete revolution for each machine cycle in a manner described hereinafter.

An irregular guide slot 263 (Fig. 2) is formed on the finger 259 and is guided over a rod 264 carried by a pair of spaced arms 265. The shape of the slot 263 is such that it coacts with the eccentric portion 260 of the sleeve 262 to cause the actuator finger 259, upon rotation of the shaft 261, to enter between two of the teeth of gear 257 and thereafter advance the gear an increment of one tooth in a direction depending upon whether the machine is operated additionally or subtractively. Near the completion of a cycle of operation of the machine the finger is returned to the position shown in Fig. 2 ready for the next actuation.

The arms 265 are journaled on bearing portions formed on the sleeve 262 concentric with the axis of rotation of shaft 261 and are pivoted by means of pins 270 (Fig. 26) to arms 268 and 268', respectively, extending upwardly from the end plates 131 and 132, respectively, of the shiftable transmission 103. Thus, the counting finger 259 is constrained to move with the shiftable transmission 103 and, whenever the transmission is centralized in an operating position, the finger 259 is aligned with one of the gears 257.

The tens-transfer mechanism for the counter is similar to that employed for the accumulator described hereinbefore. This latter transfer mechanism comprises a plurality of transfer units mounted on a shaft 276 driven in timed relation with the counter drive shaft 261 in a manner described hereinafter. Each of the various transfer teeth, such as 277 (Fig. 13), are similar to teeth 210 and supported in a like manner, so that they are adapted to be shifted longitudinally of the shaft 276 by a transfer lever 278 pivoted on a cross rod 281 supported by the various brace plates 177. The transfer levers 278 are similar in construction to levers 215 and each is moved to transferring position by a transfer lever positioning cam 280, secured to the hub 254 of the respective dial assembly (Fig 26) on movement of the respective counter dial 251 from "9" to "0" during an additive rotation or from "0" to "9" during a subtractive rotation thereof.

Since the counter mechanism comprises considerably fewer denominational orders than the accumulator mechanism, the various carry teeth 277 need not be arranged in a cross-over, staggered relation as illustrated in Fig. 17, but may be arranged in any well known manner about the shaft 276, such as that disclosed in the United States patent to Talamini, No. 1,867,603, issued July 19, 1932.

In order to indicate to the operator the particular denominational order of the counter mechanism being operated at any one time, an arm 271 (Figs. 2 and 26) is provided. Arm 271 has a bearing formed in the lower end portion thereof which is fitted over the sleeve 262 and is held against endwise movement relative to the sleeve.

Arm 271 is guided intermediately along a cross rod 273 extending from one side to the other of the machine and has an ear 274 formed at the top thereof which is painted in a color contrasting to that of the cover plate 177. The ear 274 is visible through one of a plurality of triangular openings 275 (Figs. 1 and 2) formed in the cover plate 67 of the machine and disposed directly above the counter dials 251.

*Accumulator and counter clearing mechanism*

In order to clear or reset the accumulator mechanism to zero, a zeroizing shaft 293 (Figs. 2, 14 and 18) is provided which is rotated by the hand crank 102 in a manner described hereinafter. Shaft 293 extends across the machine and has a plurality of mutilated gears 292 secured thereon, each adapted to mesh with one of the mutilated gears 192 of the different dial units. When the clear shaft 293 is in its normal full cycle position and the dialshells 194 stand at "0," the mutilated sections of the respective gears 192 and 292 will lie adjacent each other. Thus, upon digitation the gears 292 will not interfere with rotation of the respective gears 192. Likewise, when any of the dials 194 stand at "0" their respective gears 192 will not be affected by rotation of the clear shaft 293. However, the mutilated gears of those dial units which stand at digits other than "0," will be engaged and rotated until they reach their central "0" position.

During such clearing operation, the pawls 187 (Fig. 11) are moved out of the serrations of the respective planetary gear carrier discs 185, in the manner described hereinbefore, enabling the dial units, including their respective sun gears 190, to be rotated by the gears 292, carrying with them the planet gears 182 and the gear carrier discs 185, without affecting the gears 179. The shaft 188 supporting the various pawls 187 and arms 1189 has secured to the right hand end thereof an arm 300 (Figs. 15 and 18) which is pressed against the periphery of a notched disc 301 formed on a gear 302, forming part of the gear drive train for the clearance mechanism as will be described hereinafter. On movement of the gear train in any direction out of full cycle position, the disc 301 will be rotated and the arm 300 will be rocked clockwise, causing the various arms 1189 to be similarly rocked out of engagement with the pins 1188 on pawls 187. As the gear train again reaches its full cycle position, the arm 300 falls back into the notch on the disc 301 enabling the various planetary gear carrier discs 185 to be again locked for subsequent digitation.

The counter mechanism register, including the various dials 251, is cleared in a manner similar to that used in clearing the above mentioned accumulator register. For this purpose, a counter clear shaft 295 extending across the machine is provided and has a plurality of mutilated gears 294, corresponding to those at 292, which are adapted to engage the corresponding mutilated gears 253 (Figs. 14 and 26) secured to the various counter dial units. Thus, one complete rotation of shaft 295 will serve to clear the counter register. Since the counter mechanism driving means comprising the intermittently operating tooth finger 259, is normally out of engagement with any of the intermediate gears 257 during a clearing operation, no means need be provided for disconnecting this driving means from the dial gear train of the counter.

Clearance of both the accumulator and counter register dials is accomplished by the hand crank 102 as will be described in detail hereinafter; rotation of the crank in one direction serving to clear the counter register dials and rotation in the opposite direction serving to clear the accumulator register dials.

*Manually operated drive connections*

Figure 18:
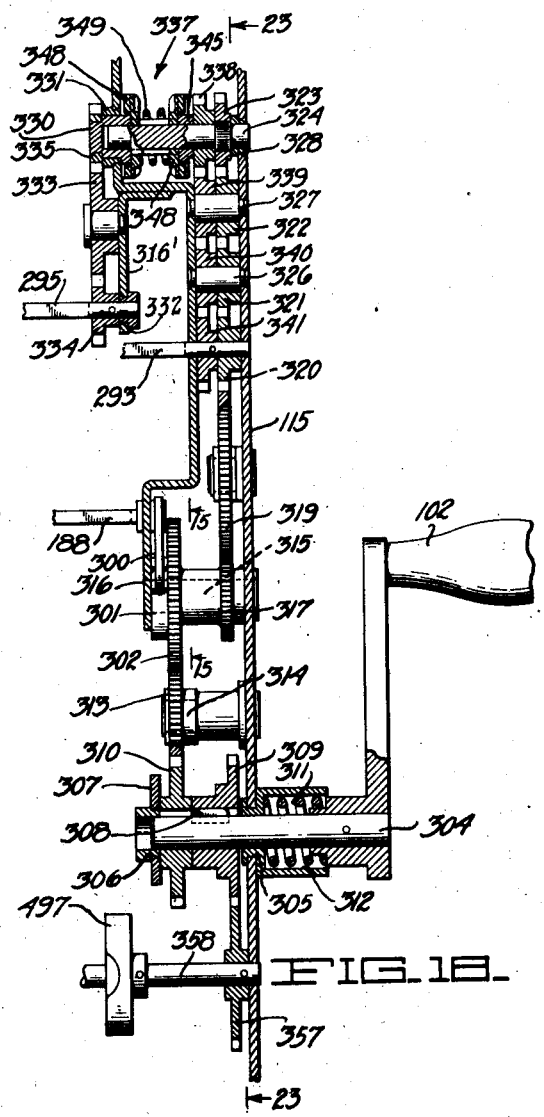
Fig. 18 is a developed sectional view taken along the right-hand side of the machine, looking down, illustrating the driving connection for the actuator and clearing mechanisms.

The entire calculating machine mechanism, with the exception of the shift mechanism, is driven by a single hand crank 102 (Figs. 1 and 18). Crank 102 is secured to a shaft 304 journaled in bearings 305 and 306, the former being mounted in the end plate 115, while the latter is mounted in an auxiliary supporting plate 307 spaced from the plate 115. The shaft 304 is slidable longitudinally in the bearings 305 and 306 and has a key 308 secured thereto and adapted to be engaged in the keyway of either an actuator drive gear 309 or a clearance drive gear 310, both of which are freely mounted side by side on the shaft 304 between the bearings 305 and 306. A compression spring 311, mounted in a socket portion 312, forming part of the bearing 305 presses against the hub of the handle 102 to move the same to the right causing the key 308 to engage the gear 309, thus positioning the crank for normally operating the actuating mechanism of the machine. However, when both the clearance mechanism and the actuator mechanism are in full cycle position, the keyways formed in the gears 309 and 310 will be aligned with each other, enabling the operator to press inwardly on the handle 102 and thus connect the shaft 304, through the key 308, to the clearance drive gear train. After the handle 102 has been moved inwardly and thereafter slightly rotated in either direction, driving the clearance mechanism, the key 308 bears against the left hand face of the gear 309 and prevents the spring 311 from returning the shaft 304 to its normal rightmost position until a full cycle position of the hand crank 102, and consequently the clearance mechanism, is reached.

Means (not shown) are preferably provided to insure a complete revolution (one cycle of operation) of the hand crank 102 in any one direction before it is rotated in the opposite direction. For a disclosure of such means reference may be had to the above mentioned patent to Lerch, No. 1,927,269.

With the addition of suitable clutches and controls, a motor (not shown) may be connected to the shaft 304 to effect a power drive for the calculating machine mechanism.

*Drive for accumulator and counter clearing mechanisms*

Means are provided for operatively connecting the crank handle 102, when in driving engagement with the gear 310, to the counter clear shaft 295 when rotated in one direction and to the accumulator clear shaft 293 when rotated in the opposite direction. Thus, connecting the gear 302 (Figs. 18 and 23) to the drive gear 310 is an idler gear 313 journaled on a bearing stud 314 secured to the end plate 115. The hereinbefore mentioned gear 302 is journaled on a stud shaft 315 extending between the end plate 115 and a supporting plate 316, and has integrally secured thereon, besides the disc 301, a pinion 317 meshing with an idler 319. The idler 319, in turn, meshes with one of a series of idler pinions 320, 321, and 322 journaled on shafts 293, 326 and 327, respectively. The idler 322 meshes with a pinion 323 secured on a shaft 324, one end of which is journaled in a bearing 326 provided in the end plate 115. The other end of the shaft 324 is journaled in a bearing formed in a clutch member 330, which, in turn, is journaled in a bearing 331 provided in a plate 316. Secured to the clutch member 330 is a gear 335 entrained, through an idler 333, with a pinion 334 secured to the counter register clear shaft 295 which shaft is journaled in a bearing 332 supported by a plate 316' integrally secured to the plate 316.

The clutch member 330 is adapted to be connected to the shaft 324 by a clutch arrangement generally designated at 337, the construction of which is disclosed and claimed in the above mentioned patent to Lerch, No. 1,927,269. Journaled on the shaft 324, and also adapted to be connected thereto by means of the clutch arrangement 337 is a gear 338 meshing with one of a pair of intermeshed idlers 339 and 340 journaled on shafts 327 and 329, respectively, independently of the idlers 322 and 321. The idler 340 meshes with a gear 341 secured to the accumulator register clear shaft 298.

Figures 20, 21:
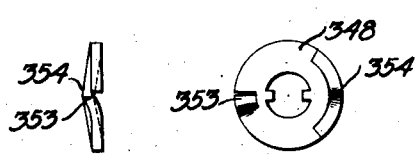
Figs. 20 and 21 are front and edge views, respectively, of the driving member of one of the unidirectional clearance clutches.
Figure 22:
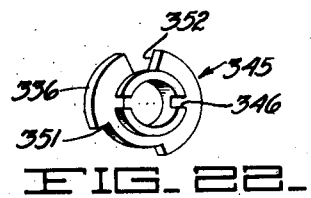
Fig. 22 is a perspective view of another clutch member forming part of the drive of the clearing mechanism for one of the registers.

The clutch arrangement 337 comprises (Figs. 18 to 22, inclusive) the clutch member 330, a second clutch member 345, a pair of clutch washers 348, one for each of the clutch members 330 and 345, and a compression spring 349 interposed between the two washers 348. The clutch member 345 has formed on the hub thereof (Fig. 22), a pair of diametrically opposed notches 346 which are engaged by corresponding projections on the gear 338, to secure these elements together. Each of the clutch members 330 and 345 has a flange formed thereon as at 336, in which are formed a pair of long and short depressions 351 and 352, respectively. Each of the washers 348 is provided with a tooth 353 (Figs. 20 and 21) which normally engages in the short depression of its associated flange 336, and is also provided with a camming projection 354 normally engaging the long depression of its associated flange. However, the tooth 353 on one of the washers 348 faces in a direction opposite to that of the tooth on the other washer. Both washers 348 are splined to the shaft 324 and are pressed into engagement with their respective clutch members by the compression spring 349. Thus, on rotation of the shaft 324 in one direction by the crank handle 102, one of the driving washers 348 will engage its respective clutch member to drive the same, while the other clutch member will be held out of engagement with its associated washer by virtue of the cam portion 354 on the washer, which slides on the full face of the flange and does not permit the tooth 353 to drop into engagement until a full revolution has been completed.

*Drive for actuating mechanism*

Meshing with the actuator drive gear 309 (Fig. 18) is a gear 357 secured on a drive shaft 358 (Figs. 18, 26, 32 and 33). This shaft is journaled in bearings formed in end plates 115 and 360 and has mounted on the left hand side thereof a clutch 361.

The clutch 361 (Fig. 26A) is somewhat similar in construction to clutch 362, to be described in detail presently, and has a gear 363 secured to the driven side thereof, which is in mesh with a gear 364 (Fig. 26) secured to the driving side of clutch 362 mounted on the heretofore mentioned actuator shaft 101. The speed ratio between the gears 363 and 364 is one to two, so that the main actuator shaft 101, which is driven during the first portion only of each machine cycle, will complete a full rotation during one half revolution of the main staft 358.

The clutch 361 is normally engaged when all of the multiplier keys 365 (Figs. 1 and 32) are in their raised position (during addition or subtraction operations) as will appear under the description of the multiplying mechanism.

Referring particularly to Figs. 30 and 31, the clutch 362 comprises a disc 366, the hub of which is journaled on the actuator shaft 101. Disc 366 has a notch formed therein adapted to be engaged by a dog 367 pivoted on a pin 368 extending between the end plates of the clutch housing, one plate of which is pinned to the shaft 101. The toothed end of the dog 367 is normally pressed into engagement with the disc 366 by a spring 369. The opposite end 367' of the dog 367 extends into an opening 370 formed on the periphery of the clutch housing and is adapted to be engaged by the toothed end 371 (Fig. 32) of a clutch operating dog 372 pivoted at 373 and urged in a counterclockwise direction by a tension spring 374.

The gear 364 is riveted to the hub of disc 366 along with a second gear 376 which meshes with a gear 377 (Figs. 26, 32 and 34) of twice its diameter. Gear 377 is journaled on a stub shaft 378 extending from the end plate 360. A pin 382 extends from the side of the gear 377 and rides in an arcuate slot 381 provided in a cam disc 380 which is also journaled on the shaft 378 independently of the gear 377. The cam disc 380 has a lobe 384 formed on the periphery thereof which is adapted to engage a roller 385 rotatably mounted on the upwardly extending end of the clutch operating dog 372 to rock this dog clockwise and therefor cause its tooth 371 to engage the clutch dog 367 (Figs. 30 and 31) and disengage the clutch 362.

When the machine is in full cycle position, the parts will be arranged as illustrated in Figs. 30 to 32, inclusive, with the pin 382 located 180° away from the point of contact of the roller 385 against the periphery of the disc 380, and with the clutch dog 367 in engagement with the notch in the clutch disc 366.

To centralize the main actuator shaft 101 in full cycle position a centralizer disc 600 (Figs. 32 and 33) is provided. This disc is pinned to the shaft 101 and has a notch formed on the periphery thereof adapted to be engaged by a roller 601 rotatably mounted on one end of an arm 602, which is pivoted at the other end on a pin 603 secured to a bracket 604, which is suitably secured to the under surface of the channel member 47. A spring 605 is tensioned between the arm 602 and a lug 606 extending from the channel member 47, to urge the roller 601 into engagement with the disc 600 and into the notch formed therein when the actuator shaft 101 is in full cycle position, or after it has been rotated through a complete revolution from full cycle position.

When the hand crank 102 (Figs. 1 and 18) is rotated from full cycle position, the clutch 362 will transmit rotation to the actuator shaft 101 and thus effect a digitational entry into the accumulator. As the gear 377 (Figs. 32 and 34) begins to rotate, the pin 382 will move to one end or the other of the slot 381 in disc 380, depending on the direction of rotation of the hand crank, and will then rotate the disc 380. At the end of the first half revolution of the hand crank 102, and consequently gear 377, the lobe 384 on disc 380 will engage the roller 385 and rock the clutch operating dog 372 clockwise to engage the dog 367 (Figs. 30 and 31) and thus disengage the clutch 362.

It will be recalled that the speed ratio between the gears 376 and 377 is two to one, and, since the pin 382 is rotated 180° from its illustrated full cycle position to rock the dog 372, the actuator shaft 101 will be declutched from the actuator drive gear train after it has completed a full revolution, and the roller 601 (Fig. 32) will be moved into the notch in disc 600 to centralize shaft 101. After the lobe 384 has passed the roller 385, the spring 374 wil become effective to rock the dog 372 away from the clutch 362. However, due to the extended length of the lobe 384, this action will not occur until the disc 366 (Fig. 30) has been rotated a sufficient amount to move the notch therein from alignment with the toothed end of the clutch dog 367. Therefore, the dog 367 will be merely pressed against the smooth periphery of the disc 366 by its spring 369, and the centralizer device including the disc 600 will prevent any friction drive which might otherwise result from friction between the disc 366 and dog 367.

At the end of a complete rotation of the gear 377, as the various drive elements reach their full cycle positions, the notch in disc 366 will again become aligned with the toothed end of the clutch dog 367, and since at this time the lobe 384 is removed from engagement with the roller 385, the spring 369 will become effective to urge the dog 367 into engagement with this notch.

The slot 381 in disc 380 permits correct timing of operation of the clutch 362 regardless of the direction of rotation of the gear 377, and the extended lobe 384 insures that the notch in disc 366 may be safely removed from alignment with the toothed end of dog 367 before the dog is allowed to be lowered into engagement with the periphery of the disc. Provision of the extended lobe 384 also enables the notch in disc 366 to be made of greater width than the corresponding dimension of the toothed end of dog 367, to facilitate engagement of these elements at the completion of a machine cycle.

The gear 377 meshes with a gear 390 (Figs. 26, 28, 29 and 32) which is journaled on a stationary shaft 391 extending between the supporting plates 360 and 392. The gear 390 is of the same diameter as that of gear 377 and has a disc 393 secured to the side thereof as by rivets 394.

Also journaled on the shaft 391 is a mutilated gear 396 having teeth extending around one-half of the periphery thereof. A pin 395 extends from the gear 396 and is adapted to engage either of the edges 398 of a long depression formed in the disc 393. This depression is of such a length as to enable the gear 390 to be rotated through 90° from either side of its illustrated position before either edge 398 formed on the disc 393 engages the pin 395 on the gear 396.

Secured to the hereinbefore mentioned transfer shaft 200 of the accumulator mechanism is a mutilated gear 400 (Figs. 26 and 32) which extends in meshing relation with the mutilated gear 396. The gear 400 has the same number of teeth as gear 396, and hence one rotation of the gear 396 will cause a full rotation of the gear 400 and consequently of the tens transfer shaft 200.

Also secured to the transfer shaft 200 is a cam disc 401 (Figs. 16 and 26) which is engaged by a cam follower 402 pivoted at 402' and having a bent over portion 404 in engagement with an arm 405 secured to the rock shaft 188 for the various pawls 187 (Fig. 11). From the above, it will be noted that as soon as the tens transfer shaft 200 is rocked from its full cycle position in either direction, the arm 402 will be rocked out of the notch formed in the cam disc 401, against the action of the spring 406, to cause the arm 405 and shaft 188 to rock the arms 1189 (Fig. 11) out of engagement with the pins 1188 on the pawls 187 and thereby allow advancement of the dial shells 194, in a manner described hereinbefore, without effecting movement of their respective drive gears 179.

With the various parts arranged in their illustrated positions during full cycle position of the drive mechanism, one quarter revolution of the crank 102 will cause the gear 390 to be advanced one quarter revolution to engage one or the other of the edges 398 of the disc 393 with the pin 395 on the mutilated gear 396, depending upon which direction the crank 102 is rotated. During the second quarter revolution of the crank 102 in the same direction, the mutilated gear 396 will be driven by the gear 390, the mutilated section thereof sliding across the mating mutilated section of the gear 400. At the end of the first half revolution of the crank 102 the gear 396 will stand ready to mesh with and drive the gear 400 during the next half revolution of the crank, while the raised portion 384 of the cam disc 380 will be just passing the roller 385 of the cam follower 372, thus effecting disengagement of the clutch 362.

From the above it will be seen that during the first half revolution of the crank 102 (assuming that the multiplier mechanism as described in detail hereinafter is not employed), the main actuator shaft 101 will be rotated one full revolution to effect a digitational entry into the accumulator, during which time the tens transfer shaft 200 will remain still. However, during the second half revolution of the crank 102, the actuator shaft 101 will remain stationary while the transfer shaft 200 will be rotated through a complete revolution to effect any necessary transitional carry. This sequence of operation is automatically followed regardless of whether the hand crank 102 is rotated in an additive or subtractive direction, because one-half revolution of the gear 377 (one complete rotation of shaft 101) in either direction must be effected before the clutch 362 will be disengaged, while one-half revolution of the gear 390 in a direction fixed relative to that of gear 377 must also be effected before the shaft 200 is rotated.

As was described hereinbefore, the various actuator gears 122 (Fig. 2) are maintained in close mesh with their respective accumulator driving gears during an entire machine cycle except when the machine is in full cycle position. To this end, the cam shaft 116 has secured to the right end thereof a gear 410 (Figs. 5 and 23) which is entrained through a series of idlers 411 and 412, with the gear 357. This latter gear, as was previously explained, is driven through gear 309 by the hand crank 102, whenever the crank is rotated to drive the actuating mechanism. The gear 410 has the same number of teeth as the gear 309 so that the cam lobe 121 on each cam 118 of the two pairs of complementary cams secured to the cam-shaft 116 will be effective to rock its corresponding cam follower 120 to dip the transmission 103 only when it approaches full cycle position.

In order to prevent an inadvertent shift of the transmission 103 during any time other than when the machine is in its illustrated full cycle position, or to prevent actuation of the machine while the transmission is being shifted from one position to another, an interlocking mechanism (not shown) may be provided between the actuator driving mechanism and the transmission shifting mechanism. Since such interlocking means between two independently operable mechanisms are old and well known in the art it is not deemed necessary to describe them herein.

Drive for counter mechanism

In order to make a positive count of substractive operations, such as is necessary in the "tear down" type of division, as well as to make positive count of additive operations, including multiplying, a reversible drive mechanism for the counter is provided.

A gear 429 (Figs. 26 and 32) is secured on a shaft 426 journaled in bearings provided in supporting plates 369 and 392, and meshes with the gear 399. A second gear 428 secured on the shaft 426 meshes with the leftmost gear 432' of a double idler unit 430 mounted on a shaft journaled in bearings provided in supporting plates 392 and 431. The rightmost gear 432 of the double idler 430 meshes directly with a gear 433 journaled on a shaft 434 which, in turn, is journaled in bearings provided in the supporting plates 392 and 431. The leftmost gear 432' of the idler unit 430 is entrained with a gear 437, also journaled on the shaft 434 adjacent the gear 433, through an idler 438. Thus, upon rotation of the main shaft 358, the gears 433 and 437 will be rotated in opposite directions.

A key slide 440 is slidably supported in a longitudinally extending slot formed in the shaft 434 and comprises a projecting key 441 which may be selectively engaged with a notch 435 in the gear 437, or in a notch 436 in the gear 433. The slide 440 is movable back and forth to engage the key 441 with either of the notches 435 and 436, by a shaft 443 slidable longitudinally in a sleeve 444 secured to the supporting plate 360. Shaft 443 is keyed into the key slide 440 by means of an enlarged head portion 442.

The position of the slide 440 and, consequently, the direction of rotation of the shaft 434 and the actuated one of the counter dials 251, is under control of radial cam 445 (Figs. 26 and 37) which operates in a notch 446 formed in the slidable shaft 443. The cam 445 has a pair of offset portions 447 and 448, the former, when in engagement with the notch 446, controlling the counter drive to rotate the counter dials 251 in a direction opposite to that of the accumulator dials 194, thereby effecting register of complementary factors such as may be desirable in division or negative multiplication operations. The offset portion 448 serves to control the counter drive to rotate the dials 251 in the same direction as the accumulator dials 194 thereby registering true factors. The cam 445 forms part of a lever pivoted at 450 and having a handle portion 451 extending through a slot 452 formed in the cover plate 67. If it is desired to change the character of the count, the handle 451 may be moved by the operator from one extreme position to the other, thereby causing the slide 440 to be shifted along the shaft 434, disconnecting one of the gears 433 or 437 from the shaft 434 and connecting the other. The handle 451 is yieldably held in either of the two extreme positions by a detent 454 pivoted at 455 and urged clockwise by a tension spring 456. A nose on detent 454 engages a tapered tip 453 formed on the cam lever.

The shaft 434 is effective to drive the counter drive shaft 261, mentioned hereinbefore in connection with the counter mechanism, and to this end a gear 525 is pinned on the rightmost end of shaft 434 and meshes with a gear 526 secured to the left hand end of shaft 261. The various gears connecting the gear 525 with the drive gear 399 are so arranged that, for each machine cycle, the shaft 261 is rotated one complete revolution to effect a one cycle operation of the finger 259 and cause the counter dial 251, associated with the finger during a particular machine operation, to be advanced an increment from one numeral to the other in an additive or subtractive direction, depending jointly upon the direction of rotation of the hand crank 102 (Fig. 1) and the setting of the counter reverse lever 451.

The hereinbefore mentioned counter tens transfer shaft 276 is likewise driven by the shaft 434, a gear 527 secured on the left hand end of shaft 276 meshing with the gear 525 for this purpose. As was described in connection with the counter mechanism, the shaft 276 is so timed relative to the counter drive shaft 261, that regardless of the direction of rotation of shaft 434, a tens transfer operation will be effected only after one of the dials 251 is actuated by the counter finger 259.

Multiplier mechanism

The machine of the present invention includes a bank of multiplier keys 365 (Figs. 1 and 32) under control of which multiple additions of a multiplicand set up in the keyboard may be effected. This unit includes a key section 458 and an actuator section 460, both of which are similar to those employed in the keyboard for setting the factor of a calculation, and which are illustrated in Figs. 2 and 3. However, instead of the differentially settable bar 54 for operating a check dial, a bar 461 is provided. This bar has a plurality of slots 462, whereby it may be guided for limited motion in a longitudinal direction by guide screws 463 secured to the channel frame 41. Bar 461 has a plurality of inclined surfaces one adjacent each key stem, and all of the same angular inclination. When one of the multiplier keys 365 is depressed, the camming tip 44 thereon engages the inclined surface adjacent its respective key stem and moves the bar 461 forward. Pivoted at 465 to the bar 461 is a clutch operating dog 466. Dog 466 is fulcrumed at 467 and is urged by a tension spring 470, connected between the dog and an extension of the member 47, in a clockwise direction. As the bar 461 is cammed forwardly by one of the multiplier keys 365, the tip 468 of the clutch operating dog 466 will engage the clutch 361 and thus disengage the same from its drive shaft 358.

As shown in Fig. 26A, the clutch 361 is somewhat similar to that illustrated in Figs. 30 and 31; however, two independently rotatable notched discs 366a and 366b are mounted side by side in the clutch housing, instead of a single disc 366. Disc 366a is pinned to the drive shaft 358 while the disc 366b is free thereon, but riveted to the gear 363. The housing of clutch 361 is journaled on bearing portions formed on the hubs of the two discs 366a and 366b. A clutch dog 367 constructed and arranged in a manner identical with that illustrated in Fig. 30 is pivotally mounted on a pin 368 extending between the end walls of the clutch housing and is adapted to be engaged by the tip 468 of the clutch operating dog 466. Thus, this disengagement of the dog 367 from the discs 366a and 366b by the dog 466 releases both the gear 363 and the clutch housing from driving engagement with the shaft 358.

The actuator drive shaft 95' (Figs. 26, 32 and 33) for the multiplier key section, corresponding to the shafts 95 (Fig. 2) is journaled at its rearmost end in the bearing provided in the channel member 47 and has secured thereto a spiral gear 473 which meshes with, and is driven by a second spiral gear 474 secured to the main drive shaft 358.

Arranged along the shaft 95' are a plurality of actuator gears 475 having graduated number of gear teeth arranged in a manner identical with those of 96 (Fig. 2). That is, the actuator gear 475 directly below the number "1" key has only one tooth, the actuator gear 475 directly below the number "8" key has eight teeth, etc. The foremost key is merely employed for the purpose of releasing any depressed key in the multiplier key bank in the event of a mistake and is constructed in the same manner as is the corresponding key of Fig. 2.

The driven shaft 476 Fig. 32 carrying the various slidable nine tooth gears 477, similar to gears 99 of Fig. 2, has secured thereon a spiral gear 478 which meshes with a spiral gear 479 mounted on a shaft 480. Shaft 480 is journaled in bearings provided in the end plate 360 and in a bearing bracket 481 and has a spur gear 482 also secured thereon. Gear 482 meshes with an idler 483 which is journaled on a stub shaft 484 and to which is integrally secured a gear 485. This latter gear 485 meshes with a gear 486 (Figs. 26 and 34) secured to the gear 377. The various gears connecting the driven shaft 476 of the multiplier actuator unit to the gear 486 are so arranged that the gear 377 will be rotated through nine revolutions during each revolution of the shaft 476. It follows, therefore, that if the number "9" multiplier key were depressed and the crank 102 subsequently rotated through a full cycle (one complete revolution), the respective selector gear 477 would be advanced 9 teeth or one complete revolution so as to revolve the gear 377 nine revolutions and effect nine complete additions or subtractions, depending upon the direction of rotation of the hand crank 102, of a factor set up in the keyboard.

*Keyboard lock*

In order to prevent depression of one of the multiplier keys 365 before operation of the machine under control of another multiplier key has been completed, or to prevent release of any of the factor entering keys 40 after the hand crank has been started and before it reaches full cycle position, a locking slide bar 491 (Figs. 2, 32 and 38) is provided. Bar 491 has several elongated slots 493 formed therein and guided along bearing pins 494 extending from the channel member 47. The bar 491 is urged toward the right by a tension spring 495, and, when the machine is in full cycle position, a plurality of notches 492 formed on the upper edge of the bar 491 are aligned with the series of locking slides 71 of the various key sections, including that of the multiplier section. With the machine in this position, the bar 491 allows the locking slides 71 to be freely reciprocated to effect latching and release of any of the keys 40 and 365. The bar 491 has a cam follower leg 496 depending therefrom and pressed by the spring 495 against the side of a disc 497 secured to the main drive shaft 358. When the machine is in its full cycle position, the cam follower 496 engages a notch formed in the disc 497, as illustrated in Fig. 38, enabling free movement of the various locking slides 71. However, when the hand crank is rotated beyond full cycle position to operate the actuating mechanism of the machine, the bar 491 is moved to the left a slight amount thus blocking rearward movement of any of the locking slides 71 and thereby preventing release of any latched down keys 40 or 365, and also preventing depression of any of these keys. As the machine again reaches its full cycle position, the spring 495 retracts the bar 491 to its illustrated position.

*Add bar mechanism*

If it is desired to automatically release any depressed keys 40 and 365 at the end of a machine operation, an add bar 500 (Fig. 1) is depressed and locked in its depressed position. This add bar is disposed directly adjacent the keyboard clear key 75 and the key stem 501 (Fig. 35) thereof is pivoted at 502 to a lever 503 fulcrumed at 504. A pin 505 on the end of lever 503 extends through an elongated slot 506 formed in a link 507. Link 507 is pivotally connected at its rearmost end by means of a pin 508' to a cam follower lever 508 which is fulcrumed at 510. This cam follower 508 has a lobe 512' formed thereon and held against the periphery of the cam disc 497, secured on the main drive shaft 358, by a tension spring 511.

A live tip 513 is pivoted to the forward end of the link member 507 by a pin 514 (Figs. 35 and 36) and a torsion spring 515 wrapped around the pin 514 normally holds the tip 513 in an extreme clockwise position relative to the link 507 with a lug 516 thereon engaging the upper surface of the link.

When the add bar 500 is in its raised position the lever 503 holds the link member 507 in a lowered position which, when the link 507 is reciprocated longitudinally, maintains the live tip 513 out of contact with the lower extremity of the keyboard clearing gate 84. However, when the add bar 500 is depressed and then allowed to be rocked rearwardly about the pivot 502 by a tension spring 519 secured between the lower extremity thereof and a pin extending from the side frame of the machine, a notch 517 formed in the key stem 501 engages a keyboard plate 518 to latch the key in its lowered position. In this position of the key 500, the link 507 is maintained by means of the lever 503 in a position to cause the live tip 513 to strike and rock the gate 84 to clear any depressed key upon forward movement of the link 507 from its extreme rearward position.

The cam disc 497 has a notch 512 formed therein and so arranged that as the machine approaches its full cycle position, the lobe 512' of the cam follower 508 falls into this notch allowing the spring 511 to pull the cam follower 508, and hence the link 507, forwardly. During this traverse, the tip 513 rocks the gate 84 and thereafter passes underneath the same until it reaches the position illustrated in Fig. 35. Upon rotation of the main drive shaft 358 in either direction from its full cycle position, the link 507 is thereby retracted rearwardly and the live tip 513 pivots about the pin 514 against the action of the spring 515 while passing beneath the lower extremity of the gate 84, and, after passing the lower edge of gate 84, again snaps back into its illustrated position.

The cam disc 497 and the cam follower 508, besides acting to automatically release any depressed key 40 and 365 at the end of a full revolution of the hand crank 102, also act as centralizing means to centralize the actuating mechanism in its full cycle position.

Although for the purpose of explaining the invention a specific embodiment thereof has been described in detail, it is to be understood that various changes may be made in the particular constructions shown without departing from the invention, which is to be limited only to the extent set forth in the appended claims.

I claim:

1. A calculating machine comprising, in combination with a frame and a multi-order register supported by said frame, each of said orders of said register comprising a driven gear, of a second frame movably supported by said first mentioned frame, a plurality of drive shafts rotatably supported by said second frame, actuating means for said drive shafts, a carriage, drive gears on said carriage and adapted to mesh with certain of said driven gears, means forming a slidable keyed connection between each of said drive shafts and a respective one of said drive gears, means for moving said frames relative to each other to separate said drive gears and said driven gears, and means for shifting said carriage along said shafts to position said drive gears to mesh with different ones of said driven gears.

2. A calculating machine comprising the combination with a frame and a multiorder register supported by said frame, of ordinal driving elements for said register, means for shifting said elements ordinally relative to said frame to permit actuation of different groups of orders of said register, drive shafts each individual to one of said driving elements and extending parallel to the direction of shift of said elements, actuating mechanism supported by said frame and including actuator shafts extending substantially perpendicular to the direction of shift, coupling means comprising flexible power transmitting members between said drive shafts and respective ones of said actuator shafts, and means for moving said elements and said drive shafts toward and away from said register in a direction substantially perpendicular to the direction of shift of said elements.

3. In a calculating machine comprising, the combination of a frame, a register mounted on said frame and including ordinal numeral wheels, a keyboard also mounted on said frame and including ordinal rows of numeral keys, a multi-order actuator including ordinal actuator shafts each operable under control of respective rows of said keys; with a plurality of ordinal drive gears for said numeral wheels and shiftable ordinally with respect thereto, drive mechanism for said gears comprising a plurality of drive shafts extending parallel to the direction of shift of said gears and each operable to drive a respective one of said gears, shift means for sliding said gears on said shafts and into position to permit actuation of different groups of said numeral wheels, and flexible power transmission elements for connecting said actuator shafts to respective ones of said drive shafts to cause actuation of the shiftable gears in accordance with the operation of said actuator shafts and with the gears in any ordinal position thereof.

WALTER E. MATHI.